United States Patent
de Castro, Jr. et al.

(10) Patent No.: US 9,241,012 B2
(45) Date of Patent: Jan. 19, 2016

(54) SYSTEM AND METHOD FOR TELEPHONY AND COMMUNICATION SERVICES WITH MESSAGE-BASED API

(75) Inventors: Jose Maria de Castro, Jr., Orlando, FL (US); Neil Stratford, Ely (GB); Wei Chen, Saratoga, CA (US); Zhiyu Liu, Beijing (CN); Xiaopu Zhu, Beijing (CN); Jason Scott Goecke, San Carlos, CA (US)

(73) Assignee: Tropo, Inc., Menlo Park, CA (US)

( * ) Notice: Subject to any disclaimer, the term of this patent is extended or adjusted under 35 U.S.C. 154(b) by 0 days.

(21) Appl. No.: 13/187,253

(22) Filed: Jul. 20, 2011

(65) Prior Publication Data

US 2012/0016932 A1   Jan. 19, 2012

Related U.S. Application Data

(63) Continuation-in-part of application No. 13/088,396, filed on Apr. 17, 2011.

(60) Provisional application No. 61/325,355, filed on Apr. 18, 2010.

(51) Int. Cl.
| | |
|---|---|
| G06F 15/16 | (2006.01) |
| G06F 15/177 | (2006.01) |
| H04L 29/06 | (2006.01) |
| G06F 9/44 | (2006.01) |
| G06F 9/54 | (2006.01) |

(52) U.S. Cl.
CPC .......... *H04L 65/1043* (2013.01); *G06F 9/4428* (2013.01); *G06F 9/54* (2013.01); *H04L 65/1006* (2013.01); *H04L 65/1009* (2013.01); *H04L 65/1053* (2013.01); *G06F 2209/541* (2013.01)

(58) Field of Classification Search
USPC ....................... 709/203; 705/14.66
See application file for complete search history.

(56) References Cited

U.S. PATENT DOCUMENTS

| | | | |
|---|---|---|---|
| 6,922,411 B1 | 7/2005 | Taylor | |
| 7,865,607 B2 | 1/2011 | Sonalkar et al. | |
| 2007/0280226 A1 | 12/2007 | Sonalkar et al. | |
| 2009/0328063 A1* | 12/2009 | Corvera et al. | G06F 9/54 719/315 |
| 2011/0046960 A1 | 2/2011 | Spier et al. | |
| 2011/0145317 A1* | 6/2011 | Serban et al. | H04W 4/00 709/203 |

(Continued)

OTHER PUBLICATIONS

Gamma et al., "Façade, Design Patterns: Elements of Reusable Object-Oriented Software," Jan. 2000, Addison-Wesley, Reading, Massachusetts, pp. 185-193.

(Continued)

*Primary Examiner* — Emmanuel L Moise
*Assistant Examiner* — Mahran Abu Roumi
(74) *Attorney, Agent, or Firm* — Galvin Patent Law; Brian R. Galvin

(57) ABSTRACT

A communication application server is provided with a unified framework for call control and media control. The framework supports a unified API having class objects and functions conforming to a telephony object model. The class objects are invoked and manipulated by a finite set of commands and an application program essentially issues a series of such commands to operate the communication application server. More particularly, an API server on the communication application server defining a messaging API protocol enables an application script to pass commands remotely to the communication application server to operate it. This allows application scripts to be processed remotely by appropriate scripting engines. In this way, application scripting is decoupled from the operation of the communication application server, which only needs to focus on providing basic communication services.

8 Claims, 19 Drawing Sheets

(56) References Cited

U.S. PATENT DOCUMENTS

2011/0231478 A1* 9/2011 Wheeler et al. ... G06F 17/30864
709/203
2011/0246308 A1* 10/2011 Segall et al. ......... G06Q 10/109
705/14.66

OTHER PUBLICATIONS

Gamma et al., "Chain of Responsibility, Design Patterns: Elements of Reusable Object-Oriented Software," Jan. 2000, Addison-Wesley, Reading, Massachusetts, pp. 223-232.

Notification of Transmittal of the International Search Report and the Written Opinion of the International Searching Authority, or the Declaration for International Application No. PCT/US2011/032909 mailed Aug. 31, 2011, 14 pages.

Listing of Claims for International Application No. PCT/US2011/032909 filed Apr. 18, 2011, 5 pages.

Non-final Office Action dated Jan. 4, 2013 in U.S. Appl. No. 13/088,396, 21 pages.

* cited by examiner

CALL Server

CALL another Endpoint

CALL Conference

APPLICATION OBJECT

CALL OBJECT

MIXER OBJECT

| <<interface>> |
| MediaService |
| |
| + output(text : String) : Output<br>+ output(media URL) :Output<br>+ output(output : OutputCommand) : Output<br>+ prompt(text : String, grammar : String, repeat : int) : Prompt<br>+ prompt(media LIRL, grammar : String, repeat : int) : Prompt<br>+ prompt(output : OutputCommand, input : inputCommand, repeat : int) : Prompt<br>+ input(grammar : String) : Input<br>+ input(input : InputCommana) : Input<br>+ record(recording : URL) : Recording<br>+ record(command : RecordCommand) : Recording<br>+ getMediaGroup() : MediaGroup |

| <<interface>> |
| MediaServiceFactory |
| |
| + create(parent : EventSource, Session : MediaSession) : MediaService |

MEDIA SERVICE OBJECT

*FIG. 10*

EVENT DIAGRAM

Application Platform having App Servers Providing Communication Services while Processing Application Scripts

Application Servers Providing Communication Services while exchanging Command Messages with Remote Application Scripts

SYSTEM AND METHOD FOR TELEPHONY AND COMMUNICATION SERVICES WITH MESSAGE-BASED API

CROSS REFERENCE TO RELATED APPLICATIONS

This application is a continuation-in-part of U.S. application Ser. No. 13/088,396 filed on Apr. 17, 2011, which claims the benefit of U.S. Provisional Patent Application No. 61/325,355 filed on Apr. 18, 2010.

BACKGROUND OF THE INVENTION

The present invention relates to telecommunication and a networked computer telephony system, and more particularly to a system and method for providing a telephony-enabled service via a message-based API interface.

Two major telecommunication networks have evolved worldwide. The first is a network of telephone systems in the form of the Public Switched Telephone System (PSTN). This network was initially designed to carry voice communication, but later also adapted to transport data. The second is a network of computer systems in the form of the Internet. The Internet has been designed to carry data but also increasingly being used to transport voice and multimedia information. Computers implementing telephony applications have been integrated into both of these telecommunication networks to provide enhanced communication services. For example on the PSTN, computer telephony integration has provided more functions and control to the POTS (Plain Old Telephone Services). On the Internet, computers are themselves terminal equipment for voice communication as well as serving as intelligent routers and controllers for a host of terminal equipment.

The Internet is a worldwide network of IP networks communicating under TCP/IP (Transmission Control Protocol/Internet Protocol) suite. Specifically, voice and other multimedia information are transported on the Internet under the VoIP (Voice-over-IP) protocol.

The integration of the PSTN and the IP networks allows for greater facility in automation of voice applications by leveraging the inherent routing flexibility and computing accessibility in the IP networks.

An example platform for easy deployment of telephony applications is described in U.S. Pat. No. 6,922,411, which entire disclosure is incorporated herein by reference. Essentially, a networked telephony system allows users to deploy on the Internet computer telephony applications associated with designated telephone numbers. The telephony application is easily created by a user in XML (Extended Markup Language) with predefined telephony XML tags (e.g. VoiceXML) and easily deployed on a website. The telephony XML tags include those for call control and media manipulation. A call to anyone of these designated telephone numbers may originate from anyone of the networked telephone system such as the PSTN (Public Switched Telephone System), a wireless network, or the Internet. The call is received by an application gateway center (AGC) installed on the Internet. Analogous to a web browser, the AGC provides facility for retrieving the associated XML application from its website and processing the call accordingly.

This type of telephony platform allows very powerful yet simple telephony applications to be built and deployed on the Internet. The following are some examples of the telephony applications deployed on this platform. A "Follow me, find me" application sequentially calls a series of telephone numbers as specified by a user until one of the numbers answers and then connects the call. Otherwise, it does something else such as takes a message or sends e-mail or sends the call to a call center, etc. In another example, a Telephonic Polling application looks up from a database the telephone numbers of a population to be polled. It then calls the numbers in parallel, limited only by the maximum number of concurrent sessions supported, and plays a series of interactive voice prompts/messages in response to the called party's responses and records the result in a database, etc. In another example, a Help Desk application plays a series of interactive voice prompts/messages in response to the called party's responses and possibly connects the call to a live agent as one option, etc. In yet another example, a Stock or Bank Transactions application plays a series of interactive voice prompts/messages in response to the called party's responses and conducts appropriate transactions with a backend database or web application, etc.

The latter examples are generally referred to as self-help applications. In the voice context, a self-help application is referred to as IVR. IVR refers to Interactive Voice Response and is a technology that automates interaction with telephone callers. Enterprises are increasingly turning to IVR to reduce the cost of common sales, service, collections, inquiry and support calls to and from their company.

IVR solutions enable users using voice as a medium or other form of inputs through a voice channel to retrieve information including bank balances, flight schedules, product details, order status, movie show times, and more from any telephone. Additionally, IVR solutions are increasingly used to place outbound calls to deliver or gather information for appointments, past due bills, and other time critical events and activities.

FIG. 1 illustrates schematically a communication application environment. The communication application environment 10 includes one or more client interacting with a communication application server 200 in an application platform 100. The application platform 100 hosts an application specified by an application script 210 coded in object-oriented software. The communication application server 200 includes a browser 220 for interpreting and executing the application script 210. The execution of the application script invokes one or more server-side components 310 in the application server 200. Among the clients and the communication server, these components 310 provide services for call control, media control with one or more media server 230 and interactions with back-end systems 240 such as databases, and business logic and legacy systems such as CRM (Customer Relationship Management) and ERP (Enterprise Resource Planning). One example of the platform is to host an IVR application which interacts with voice, text messaging and other clients in a multi-channel environment.

The communication application platform provides a third-party call control between any numbers of clients 20, 22, 30. The application script 210 defines the communication application 300 and directs how a call is to be handled. For example, when a user makes a call through a voice client such as a handset 20 or a VoIP phone 22 to the IVR, the voice application script 210 associated with the call number is retrieved. The browser 220 executes or renders the retrieved voice application script to allow the user to interact with the voice application 300.

Communication of Multimedia information among endpoints and a third-party call controller generally require call control and media control.

FIG. 2A to FIG. 2C illustrate various call scenarios among a number of clients such as VoIP phones 22 or endpoints and a communication application server 200.

FIG. 2A illustrates a client in the form of a VoIP phone calling the communication application server. For example, the communication application server 200 hosts an IVR and the VoIP phone 22 calls the IVR. Call signaling and media are exchanged between the VoIP phone 22 and the application server 200.

FIG. 2B illustrates a first VoIP phone calling a second VoIP phone. As a third-party call controller, the application server 200 controls the call between the first and second phones. A call connection is established between the first phone 22-1 and the application server 200. Another call connection is established between the second phone 22-2 and the application server 200. The two calls are then joined at the application server to allow the first phone to talk to the second phone. In this scenario, media can be handled in one of two modes. In the bridged mode, media exchanged between the two phones are routed through the application server. In the direct mode, the media is exchanged directly between the two phones.

FIG. 2C illustrates three phones in conference. In this scenario, each phone establishes a call to the application server. The three calls are then joined or mixed at the application server to provide a conference facility.

For call control, a number of protocol standards have been put forward for interoperability. For example, the H.323 standard is a protocol standard recommended by the ITU (International Telecommunication Union) for signaling and call control of IP telephony.

An increasingly popular alternative to the H.323 standard for call control is SIP ("Session Initiation Protocol".) SIP is an IETF (Internet Engineering Task Force) protocol for signaling and call control of IP telephony and multimedia communication between two or more endpoints. It is text-based and more web-centric and is a comparatively simpler and more light-weight alternative to H.323.

In the traditional web paradigm, a user agent in the form of a client machine running a web browser makes a request to a web server. The web server returns a response to the request. The communication is taking place under the HTTP (Hypertext Transfer Protocol). Specifically, the web browser requests a web resource such as a web page as specified by an URL from a web server. Typically the web server responds by returning the requested web page. The web page may contain text content with embedded instructions for the browser to render the text in the web page. In more sophisticated applications, a web page is often generated dynamically by employing server-side programs and may incorporate content as queried results from backend databases. Thus, some of the content are not hard-coded on the web page but are generated and rendered dynamically by the web server. The server-side programs may also serve to post data from the client to the backend databases.

Traditionally, these server-side programs are implemented as scripts conforming to the CGI protocol (Common Gateway Interface). The CGIs are code modules that perform the task on the web server to generate and render dynamic content or perform other backend functions.

However, CGI has several disadvantages. First, it is not very portable, as different web serving machines with different processors and operating systems may require their own versions of scripts. Secondly, it does not use the server resource efficiently. The different GCIs are run in a different process context than the server which starts them. There is the overhead of creating a new process for each request and the different processes do not have access to a common set of server resources.

The JAVA™ servlet model addresses the disadvantages of the CGI. Servlets are modules written in the highly portable JAVA™ programming language as they run in the same virtual JAVA machine, which is independent of the processor hardware or the operating system. In the objected-oriented Java programming language, the HTTP requests are parsed and made to interact with software objects modeled on the real objects that operate with the application. Similarly, the responses are made to conform with the HTTP protocol before being sent to the requester. Servlets runs in a multi-tread environment in the Java server and allows each request to be handled by a separate tread. Also one instance of the Java scripts need be loaded into the processor memory as compared to CGI where contemporaneous requests require multiple copies of the CGI scripts to be loaded. The original servlets conform to the HTTP protocol and may be regarded as "HTTP servlets". The servlet model provides a set of API (Application Programming Interface) that is implemented by loading a corresponding servlet container in the application server. The servlet model enables developers to rapidly develop applications and to port them to different servers and be able to run them efficiently. It is widely used in web applications and is based on open standards.

The API is an abstraction that describes an interface for the interaction with a set of functions used by the components. It is a list containing the description of a set of functions that is included in a library and that address a specific problem. In the current context of Java object oriented languages, it comprises a description of a set of Java class definitions and extension class definitions with a set of behaviors associated with the classes. The API can be conceived as the totality of all the methods publicly exposed by the classes (the class interface). This means that the API prescribes the methods by which one handles the objects derived from the class definitions.

For call control, a SIP servlet has been developed and established as a standard to handle requests under the SIP protocol, just as the HTTP servlet handles requests under the HTTP protocol.

FIG. 3A illustrates an existing implementation of the call control objects of the server-side components of the communication application shown FIG. 1 being implemented as SIP servlets. The call control objects are in the form of SIP servlets 320. This is possible through the implementation of a SIP servlet container 340 and a SIP servlet call control API 350.

The SIP Servlet Specification (JSR 289) is a container based approach (modeled on the HTTP servlet paradigm) to developing communication applications utilizing the Session Initiation Protocol (SIP) protocol. A SIP servlet is a Java programming language server-side component that perform SIP signaling. SIP servlets are managed by a SIP servlet container, which typically is part of a SIP-enabled application server. SIP servlets interact with clients by responding to incoming SIP requests and returning corresponding SIP responses. SIP servlets are built of the generic servlet API provided by the Java Servlet Specification which is established as an open standard by the Java Community Process (SM) Program through the Java Specification Request (JSR) process.

Using a SIP servlet (JSR 289) for call control is to leverage the benefits of the servlet model. It also provides a Java API independent of underlying media server control protocols.

U.S. Pat. No. 7,865,607 B2 discloses a servlet model for media rich applications. The SIP servlet for call control is augmented by a media control API. However, the media control API is custom and does not conform to the servlet model.

For media control, media control objects are being supported by a standards-based media control API, JSR 309 as shown in FIG. 3A. Thus, media server specifics are handled by a JSR 309 Driver, allowing an application developer to program using the JSR 309 API, independent of the media server vendor. In this way, the applications can work with different media servers that are deployed by different operators and service providers.

Thus, an application developer can develop components of a communication application in terms of low level call control objects and API in the form of a SIP Servlet based on the open standards JSR 289 and in terms of low level media control objects and API in the form of the open standards JSR 309.

One disadvantage of working with low level and generic objects and their APIs is that the developer has to repeatedly deal with low level details even if many of these details are irrelevant when the object being modeled is in certain states.

FIG. 3B illustrates how the existing implementation of the application has to deal with every event under the standard call control and media control API shown in FIG. 3A. For example, the SIP servlet receives a BYE request to end a call. It examines what state it is in to act according. In the case when it is still in a "CONNECTED" state, it will call the doBYE method to end the connection and perform related call teardown and cleanup tasks. However, a user may decide to hang up a call even before the call connection is established. In that case, it is not even in the "CONNECTED" state and therefore given the state, there was no need for the servlet to receive the BYE request and to perform any call teardown tasks. Nevertheless, in the current implementation, every time the BYE request is received, the servlet will have to check against its state and act accordingly. Thus, the added burden of checking and dealing with irrelevant requests becomes part of the application code. The same is true for the media events and the application has to furnish the logic and additional codes to deal with events which may not be applicable to the current state.

It is desirable for an application to be developed without having to deal with details irrelevant to the object model being dealt with. Furthermore, it is desirable to have a systematic and uniform way of working with call control and media control events, without having to deal with their low level details in the application so as to have succinct and efficient codes.

FIG. 1 shows a server architecture in which the script processing or scripting is performed by the server that is also executing the resultant execution codes. The scripting is language- and protocol-specific, such as for example, processing a script written in the Java or JavaScript language.

However, increasingly users and application developers are using other light-weight protocols and languages to code the application scripts. These include Ruby, Python, Groovy and PHP. With a growing range of languages and protocols, it is difficult for a hosting facility to provide compatible browsers for each of the possible programming languages and protocols.

Even if a large number of browsers is supported, the resultant execution codes from these different browsers will all run in the same Java virtual machine of the application server. Without a standard protocol to the unified API, the different scripts running in the same virtual machine may contend with each other, resulting in poor performance, memory leaks and, worst still, object collisions. Also, having to support a wide set of possible scripts make resource provisioning and budgeting in the communication platform difficult and indefinite.

Thus, there is a need to provide a more flexible arrangement for telephony services and communication application deployment to be driven by scripts coded with a variety of user-preferred programming languages and protocols without the above-mentioned disadvantages.

SUMMARY AND OBJECTS OF THE INVENTION

According to a general aspect of the invention, a communication application server is provided with a unified framework for call control and media control. The framework supports a unified API having class objects and functions conforming to a telephony object model. The class objects are invoked and manipulated by a finite set of commands and an application program essentially issues a series of such commands to operate the communication application server. More particularly, an API server on the communication application server defining a messaging API protocol enables an application script to pass commands remotely to the communication application server to operate it. This allows application scripts to be processed remotely by appropriate scripting engines. The resulting execution codes from the scripting are expressed in terms of the commands of the finite set, which are then sent to the communication application server. The API server at the communication application server parses out the commands from the messages to have the communication application server executes the commands as they are available for execution.

In a preferred embodiment, the communication application server is among a group of similar communication application servers on the network to provide telephony and communication services to a plurality of customers with application scripts hosted on scripting engines. One or more communication API gateway for the group of communication application servers is deployed on the network to serve as a messaging broker between the plurality of customers with application scripts and the group of communication application servers.

In a preferred embodiment, the scripting engine and the application server communicate by messaging via a bidirectional connection, such as under the XMPP protocol.

In this way, application scripting is decoupled from the operation of the communication application server, which only needs to focus on providing basic communication services. A customer using the communication services can code the application script in a preferred programming language using a custom framework providing a set of customer-specific libraries. Scripting can be performed by third party scripting engines. The resulting execution codes only need be expressed in terms of the finite set of commands and sent as messages to operate the communication application server.

Additional objects, features and advantages of the present invention will be understood from the following description of its preferred embodiments, which description should be taken in conjunction with the accompanying drawings.

BRIEF DESCRIPTION OF THE DRAWINGS

FIG. 10 illustrates the media service object in a UML diagram.

UNIFIED FRAMEWORK FOR CALL CONTROL AND MEDIA CONTROL

According to a general aspect of the invention, a communication system includes a server hosting a communication application. The communication application is programmed with a unified communication API. The unified communication API being in a unified communication framework layer on top of a standards-based call control API and a standards-based media control API. The unified communication API provides access to unified objects constructed from primitive objects from the individual call control API and the media control API.

A software framework, in computer programming, is an abstraction in which common code providing generic functionality can be selectively specialized by user code providing specific functionality. Frameworks are a special case of software libraries in that they are reusable abstractions of code wrapped in a well-defined API, yet they contain some key distinguishing features that separate them from normal libraries. In this case, the unified communication API represents a further abstraction from the primitive call control and media control APIs that more closely models the real situation being addressed by the application.

The abstraction to a higher-level object models facilitates software development by allowing designers and programmers to devote their time to meeting software requirements rather than dealing with the more standard low-level details of providing a working system, thereby reducing overall development time.

Figure 4:
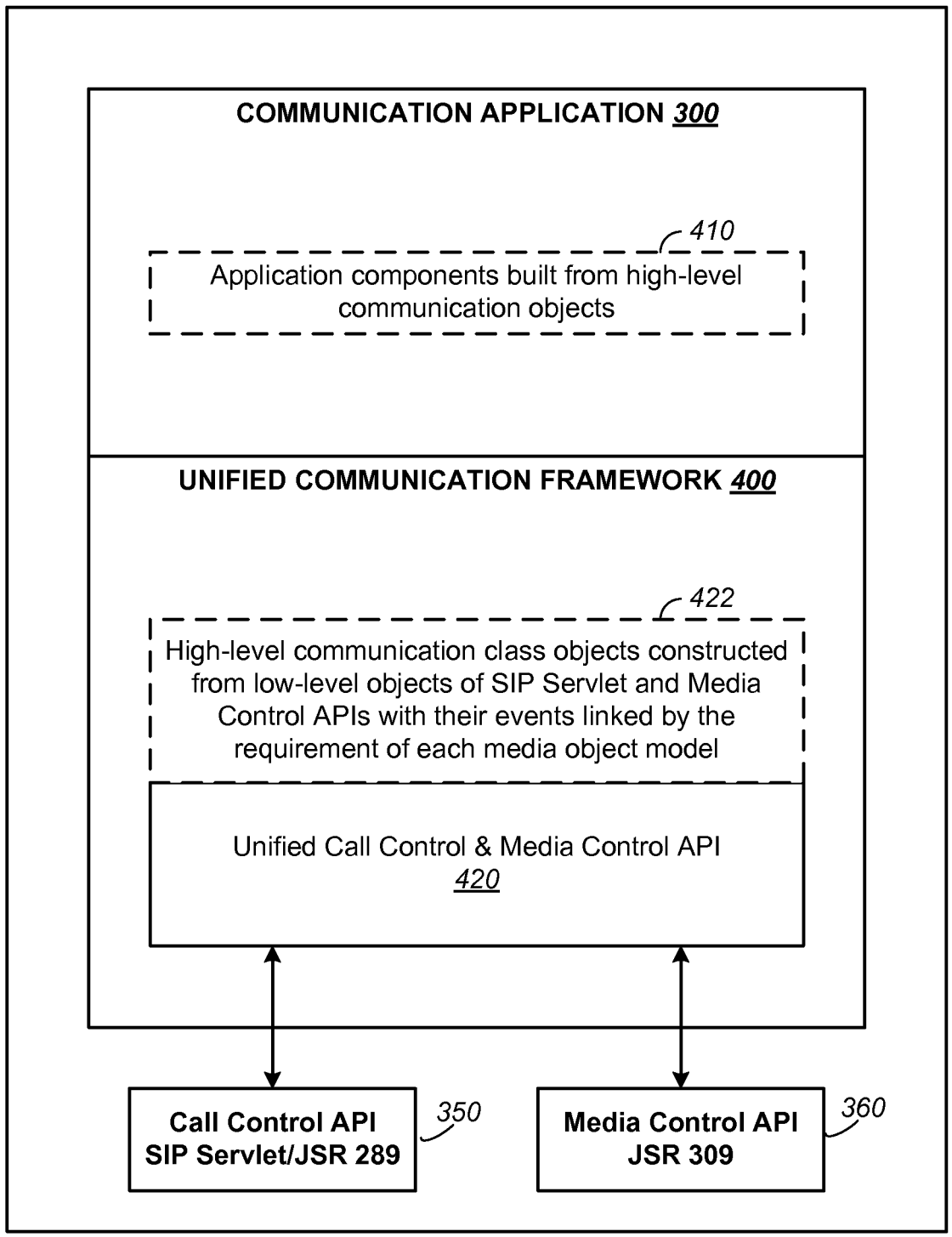
FIG. 4 illustrates schematically a general implementation of the unified communication framework.

FIG. 4 illustrates schematically a general implementation of the unified communication framework. A unified call control and media control API 420 is provided in the unified communication framework 400. The unified API 420 defines a set of class objects 422 (unified communication objects) that is a higher level abstraction of the object model. The unified communication objects 422 are higher-level constructs of the primitive objects defined by the lower-level call control API 350 and media control API 360. Thus, instead of the components of an application being built from manipulation of the primitive objects, they are built from those of the unified communication objects.

Figure 5:
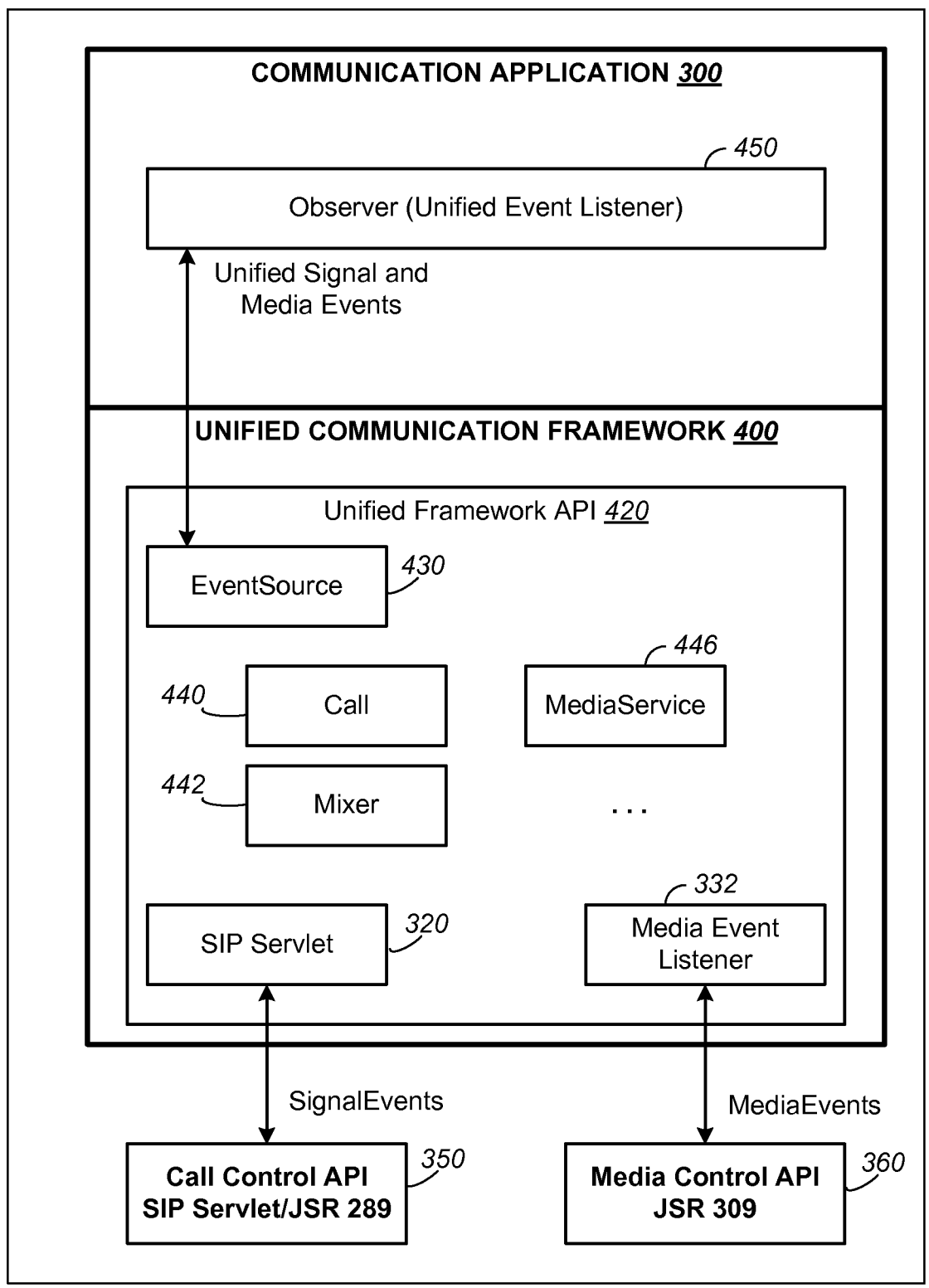
FIG. 5 illustrates the implementation of a unified communication framework for programming communication applications in which a communication server acts as a 3rd party call control and media control similar to that shown in FIG. 1 and FIGS. 2A-2C.

FIG. 5 illustrates the implementation of a unified communication framework for programming communication applications in which a communication server acts as a 3rd party call control and media control similar to that shown in FIG. 1 and FIGS. 2A-2C. It builds upon SIP Servlet (JSR 289) API 350 and Java Media Control (JSR 309) API 360 by providing a unified model for both call and media control while still exposing direct access to the lower JSR 289/309 APIs. However, the object model is generic enough to allow implementation on top of other protocol, such as Jingle, and other type of communication, such as Instant Messaging. The unified communication framework provides a unified framework API 420 which includes a set of unified communication object classes. A communication application can be coded in terms of manipulation of these unified communication objects classes as well as the primitive object classes of the JSR 289 and JSR 309 APIs. Examples of these unified communication objects are Call 440, Mixer 442, MediaService 446, EventSource 430, SIP Servlet 320, MediaEventListener 332, observer 450, etc.

The advantage of building applications with a unified communication framework is that the application is built with high-level objects more specific to the application in question. Call control and media control events are tied to the specific behaviors of these high-level objects resulting in a more systematic and uniform way of working them, without having the application to deal with low-level details. In this way, low-level details irrelevant to the object model are shielded from the application developer and the application codes are more concise and efficient.

Figure 6:
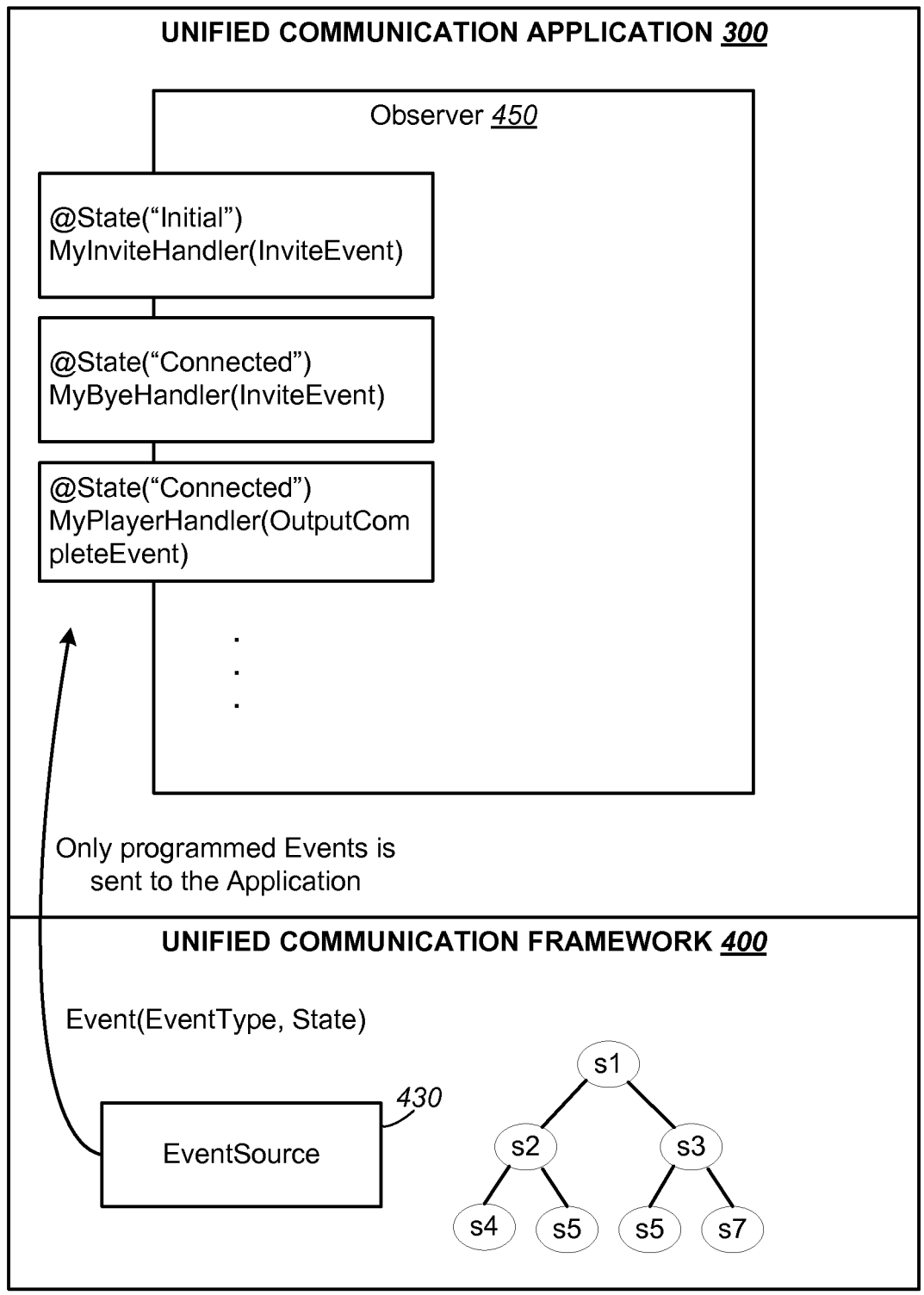
FIG. 6 illustrates examples of the efficient handling of events by an application in the unified communication framework.

FIG. 6 illustrates examples of the efficient handling of events by an application in the unified communication framework. A unified event handling is implemented by the unified event source object 430 and the observer object 450. The unified event source object, EventSource 430 serializes both call control events and media control events such that the application component listening to the event source only has to deal with one event at a time. The application 300 incorporates the observer object 450 which listens to events from the unified event source object 430. The observer object 450 defines event handling methods which have a single parameter and whose type is the type of events generated by the unified event source object 430. The event handling methods define @State annotation as defined by the unified application framework. The unified event source object 430 dispatches events to the event handling method when the type of event either matches the type of the single parameter defined in the even handling method or is the supertype of the type of the single parameter. If the value of the @State annotation is not empty, the unified event source object only dispatches events to the event handling method when the value of @State annotation matches the state property of the unified event source object.

encing, and Call Center applications. It assumes all the calls have at least their signals controlled by the communication application. In most cases, media should preferably be controlled by the communication application as well.

TABLE 1 lists example classes/objects related to call control of the unified communication framework in the preferred embodiment.

TABLE 1

| CLASS | DESCRIPTION |
| --- | --- |
| Application | Defines lifecycle callbacks and inbound call handling for a unified communication application. |
| Observer | A weak-typed listener that can listen on both SignalEvent and MediaEvent. The unified framework supports dispatching event to Observers based on event type and state. |
| Call | A call is a leg of communication from an Endpoint to Application. The leg must have signal controlled by the Application, optionally media as well. |
| InviteEvent | Invitation is an incoming call alert. This is a key event to start the call control. |
| Participant | This represents an abstract party involved in a conversation |
| MultiStreamParticipant | A type of Participant which can have multiple media streams |
| Mixer | This is used to mix multiple.Participants together. A mixer is also a Participant, so other Participants can be joined/unjoined to a Mixer. The media streams of joined participants are mixed (or add, or sum) into a single stream, then the result stream is sent out to every joined Participant. |
| Conference | Represents a real conference that other Participant can join/unjoin. Every Participant that joined a conference receives media from all other participants in the same conference. |
| Join | A Joint represents the result of the asynchronous join operation on Participant. Extends the Future interface, so can be used to check if the join operation is complete, to wait for its completion, and to retrieve the result of the operation. |

Thus the observer object 450, will receive events coming from the EventSource 430 which are only appropriate in certain application state. For example, the application can only begin to consider an invite to become part of a call after the application has been initialized (i.e., in the state "Initial".) When that event is received, the application will then invoke the MyInviteHandler to process the invite. Similarly, the event (i.e., BYE) to terminate a call with its associated teardown and cleanup operations will only be appropriate after the call has actually been established (i.e., in the state "Connected".) When that event is received, the application will then invoke the MyByeHandler to process the BYE. Similarly, the OutputCompleteEvent event to play media is appropriate in the context when the application is in the "connected" state. When that event is received, the application will then invoke the MyPlayerHandler to process the media.

Figure 3A:
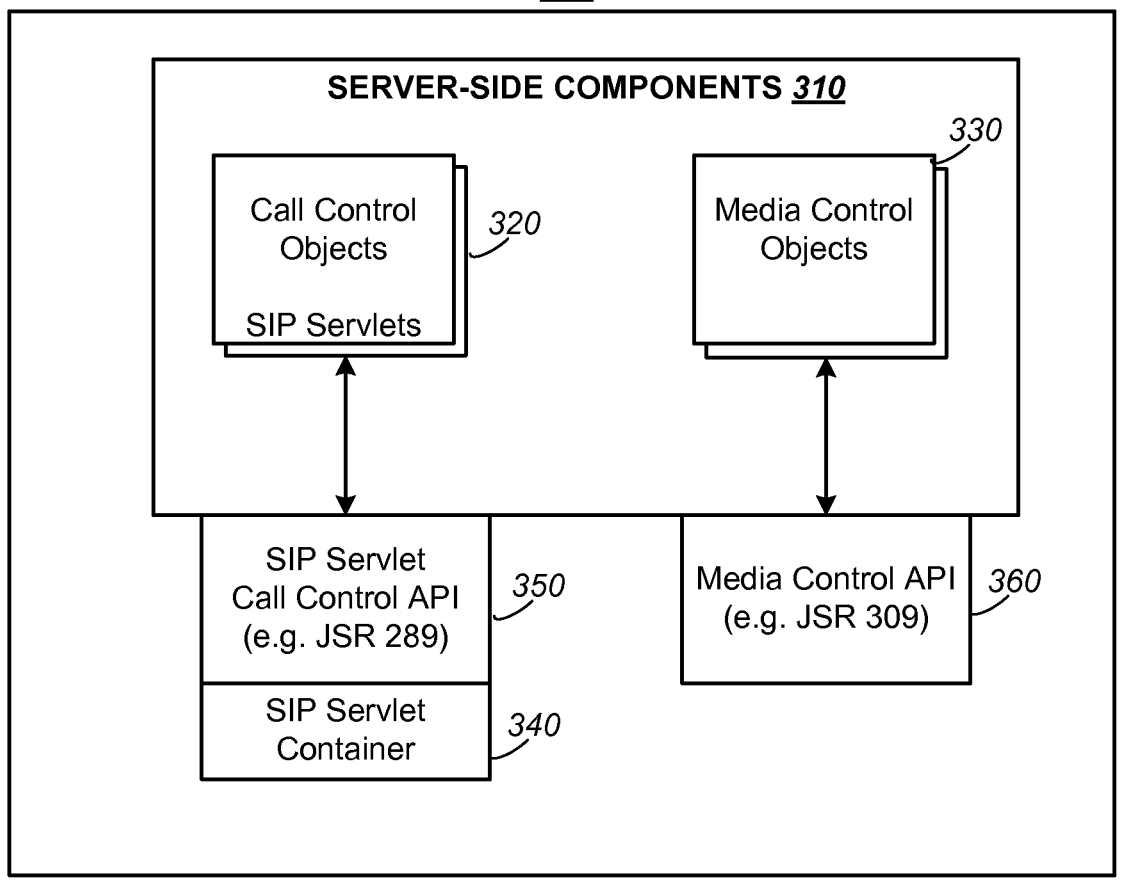
FIG. 3A illustrates the call control objects of the server-side components of the communication application shown FIG. 1 being implemented as SIP servlets.
Figure 3B:
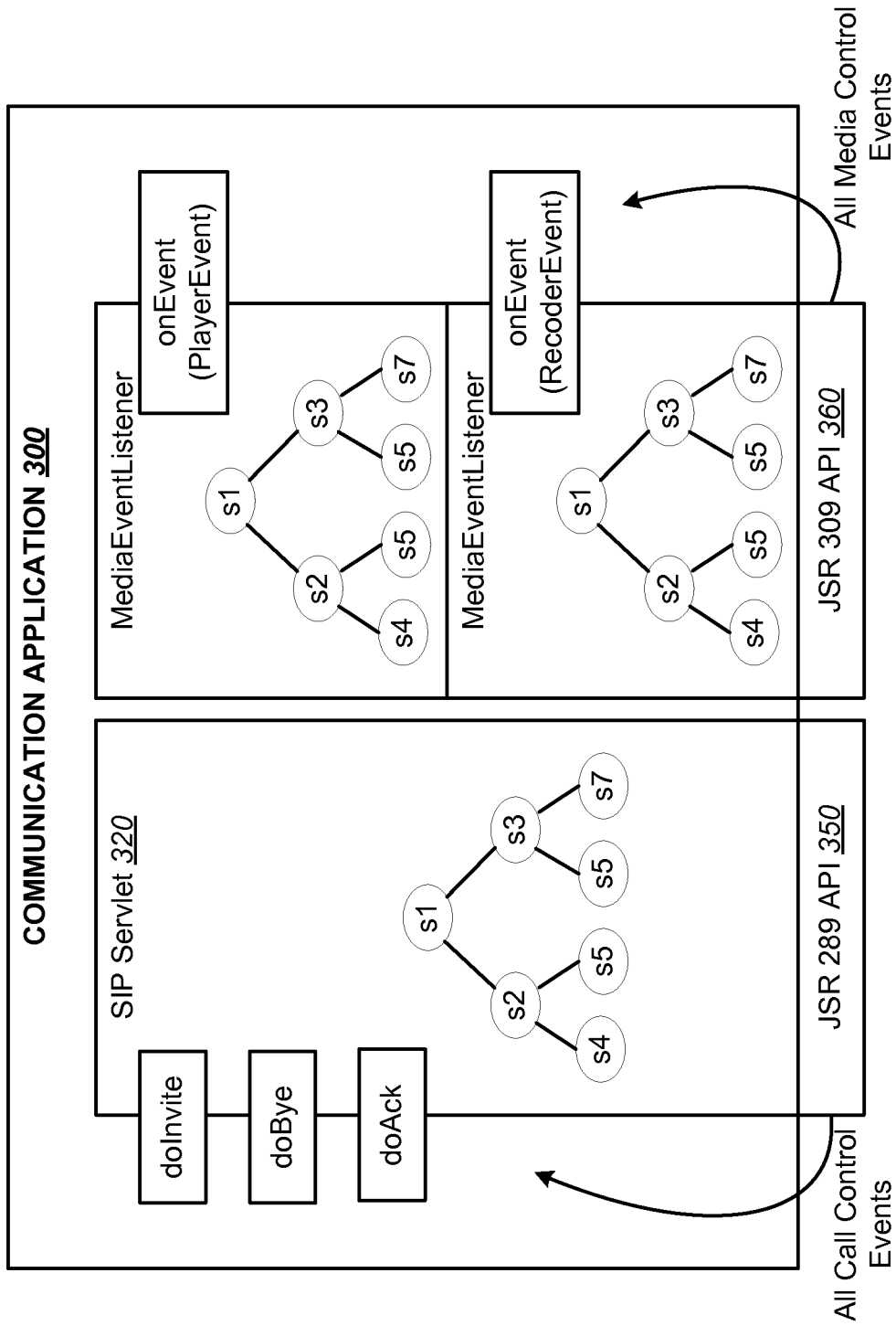
FIG. 3B illustrates how the application has to deal with every event under the standard call control and media control API shown in FIG. 3A.

Unlike the prior example shown in FIG. 3B, where the application has to listen to and process every events generated by the JSR 289 API and the JSR 309 API, these events are first handled by the EventSource object 430 in the unified communication framework. The EventSource will only send selective, programmed events to the application. For example, if the event is BYE and the state is "connected", it will send the event to the application. On the other hand, if the state is "not connected", it will not send the event to the application. By dealing with high-level objects abstracted from low-level objects of JSR 289 and JSR 309, programming at the application level is more efficient and relevant to the problems at hand.

Figure 7:
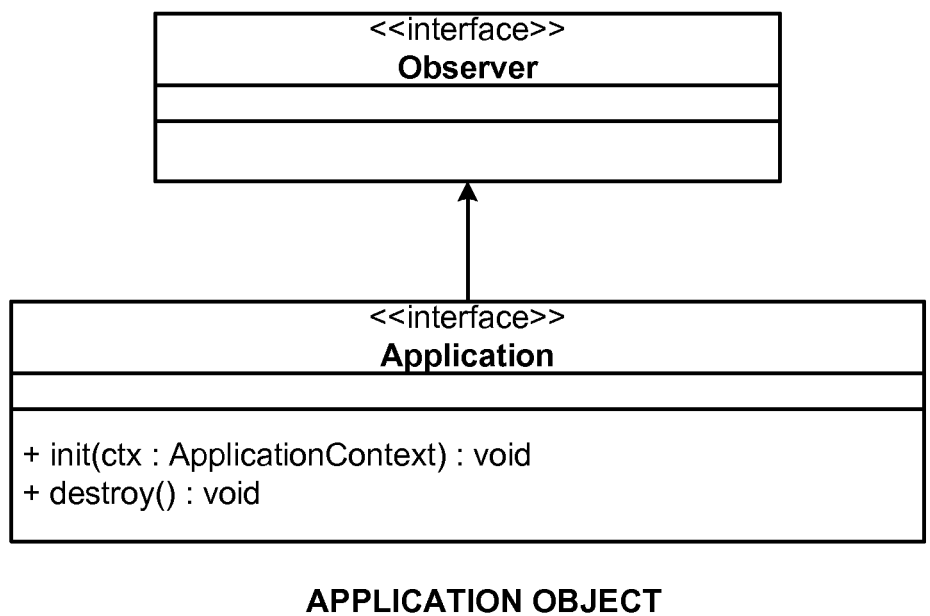
FIG. 7 illustrates the Application object in a UML (Unified Modeling Language) diagram.

The call control model of the unified communication framework is designed for calls and media that are controlled by a 3rd party server application, such as PBX, IVR, Confer- FIG. 7 illustrates the Application object in a UML (Unified Modeling Language) diagram. It is responsible for lifecycle management by implementing init( ) and destroy( ). Also it observes inbound calls by implementing an observer method that takes a type of SignalEvent.

Borrowing the concept from CCXML and JSR 309, the unified framework uses various join method to connect different call legs. A Participant can join with other Participants. Individual streams in MultiStreamParticipant can be joined by using JSR 309 Joinable construct. The unified framework also supports multiple joins with automatic join degradation.

Typically an inbound call results in an InviteEvent sent to the Application. The application can decide to accept, reject, or redirect the InviteEvent. Once the InviteEvent is accepted, a Call (leg) is formed. Observer can be added on the Call to continue monitor and control the leg. The application can further join the Call with the media server, or join the Call to another Endpoint, or join the Call to another Participant.

Figure 8:
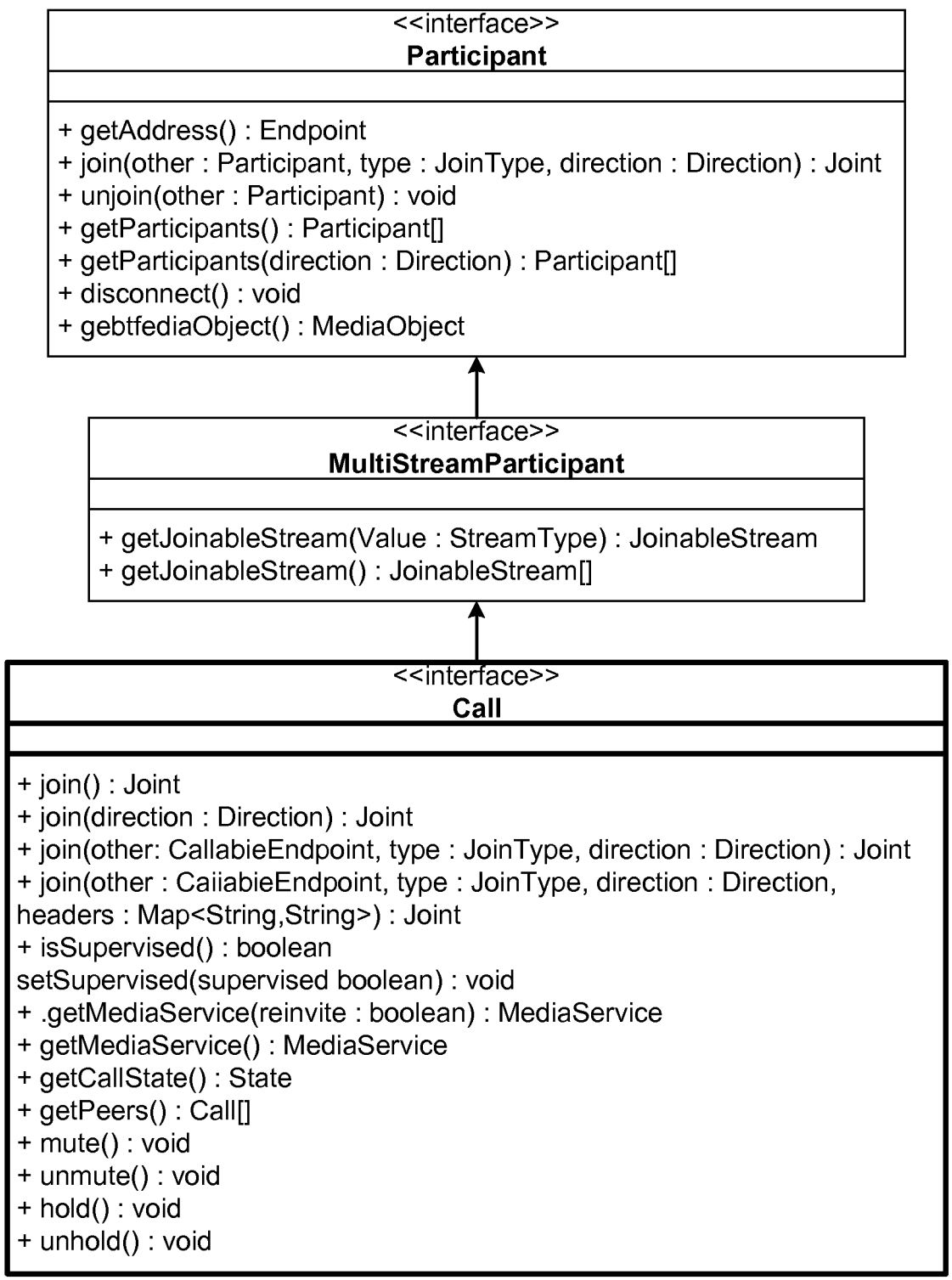
FIG. 8 illustrates the Call object in a UML diagram.

FIG. 8 illustrates the Call object in a UML diagram. It has a number of methods including join, getMediaService, mute, unmute, etc. It also inherits from the MultiStreamParticipant object which in turn inherits from the Participant object.

Figure 9:
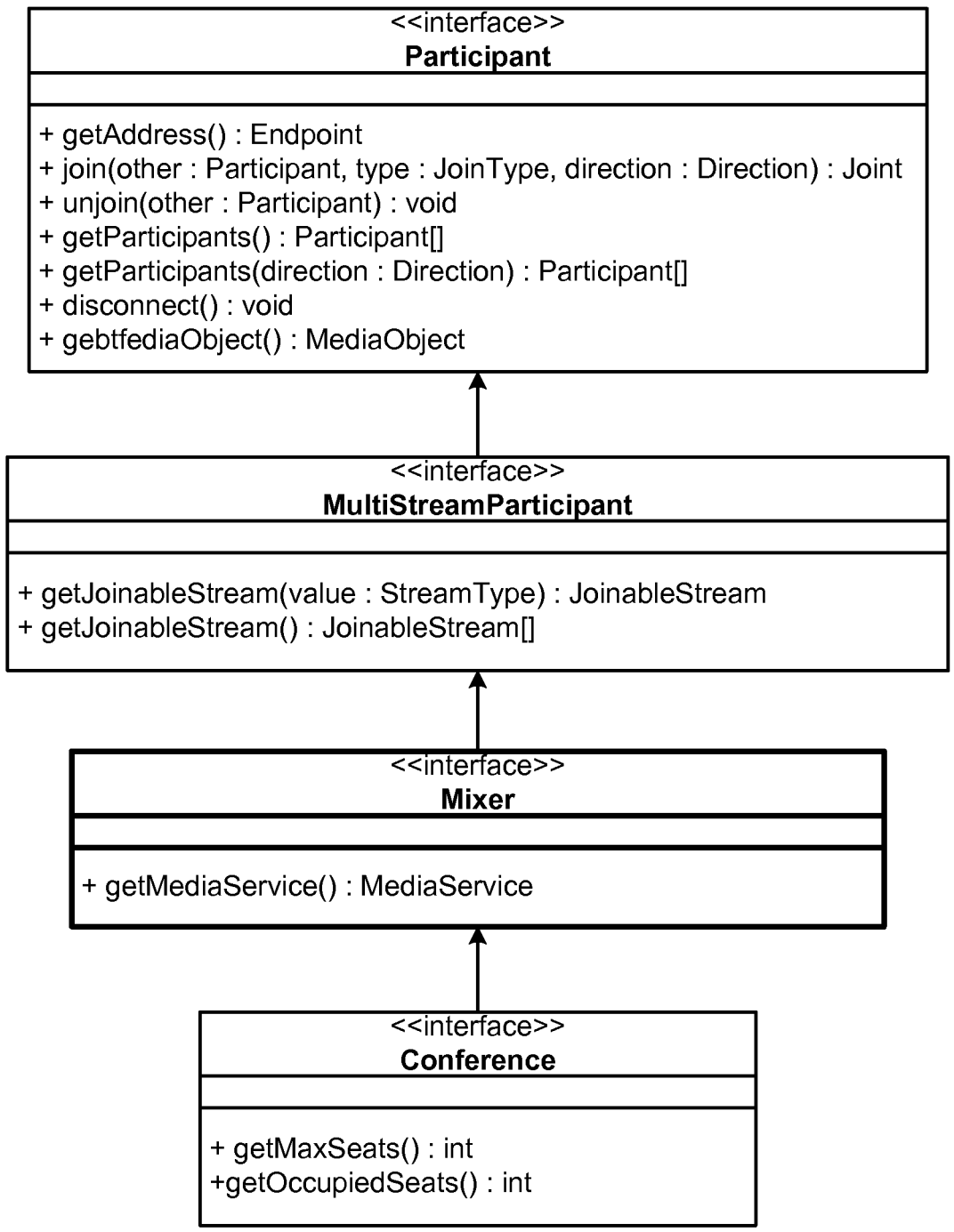
FIG. 9 illustrates the Conference object in a UML diagram.

FIG. 9 illustrates the Conference object in a UML diagram. It inherits from Mixer object which in turn inherits from MultistreamParticipant, which in turn inherits from Participant. The methods exposed are shown in their respective boxes.

The media control model of the unified communication framework assumes each call has media capabilities as long as its media streams are connected to a JSR 309 compliant media server. Once a call is in the INPROGRESS or CONNECTED state, getMediaService( ) can be used to access the media services. In case the media streams are connected in a DIRECT mode, (see for example FIG. 2A) the unified communication framework will try to reinvite the media streams back to the media server into a BRIDGE mode (see for example FIG. 2B.)

TABLE 2 lists example classes/objects related to media control of the unified communication framework in the preferred embodiment. MediaService defines all the media functions available to a call.

TABLE 2

| INTERFACE | DESCRIPTION |
| --- | --- |
| MediaService.input( . . . ) | provides control on both DTMF and speech recognition |
| MediaService.output( . . . ) | provides control on both TTS and media playback |
| MediaService.prompt( . . . ) | allows the application to control both outputs and inputs at the same time |
| MediaService#record( . . . ) | allows the application to record both inputs and outputs |

To use the media function on the Call, simply get the MediaService from the Call. If the media is not going through the server, the unified communication framework will try to re-invite the media back to the server if possible.

FIG. 10 illustrates the media service object in a UML diagram.

The unified framework programming model is an event-driven model. It has a coarse-grained event types to make the application focus on the business logic rather than the lower level protocol. It combines with a state-based event dispatching mechanism and one-thread-per-event source (in most cases) to make the application much easier to write.

Table 3 lists example classes/objects related to events of the unified communication framework in the preferred embodiment.

TABLE 3

| CLASS | DESCRIPTION |
| --- | --- |
| Eventsource | An EventSource is an object that can generate Events in Application. Applications can set application defined state on EventSource by calling #setApplicationState(String) setApplicationState(String) for single state or #setApplicationState(String, String) setApplicationState(String) for multiple concurrent states. |
| SignalEvent | Represents the events from underlying signaling protocol, such as SIP BYE, REFER, INVITE, etc. |
| MediaEvent | represents the events from progress and status of the execution of media functions. |
| Observer | a weak-typed listener that can listen on both SignalEvent and MediaEvent. The unified framework supports dispatching event to Observers based on event type and state. |

Figure 11:
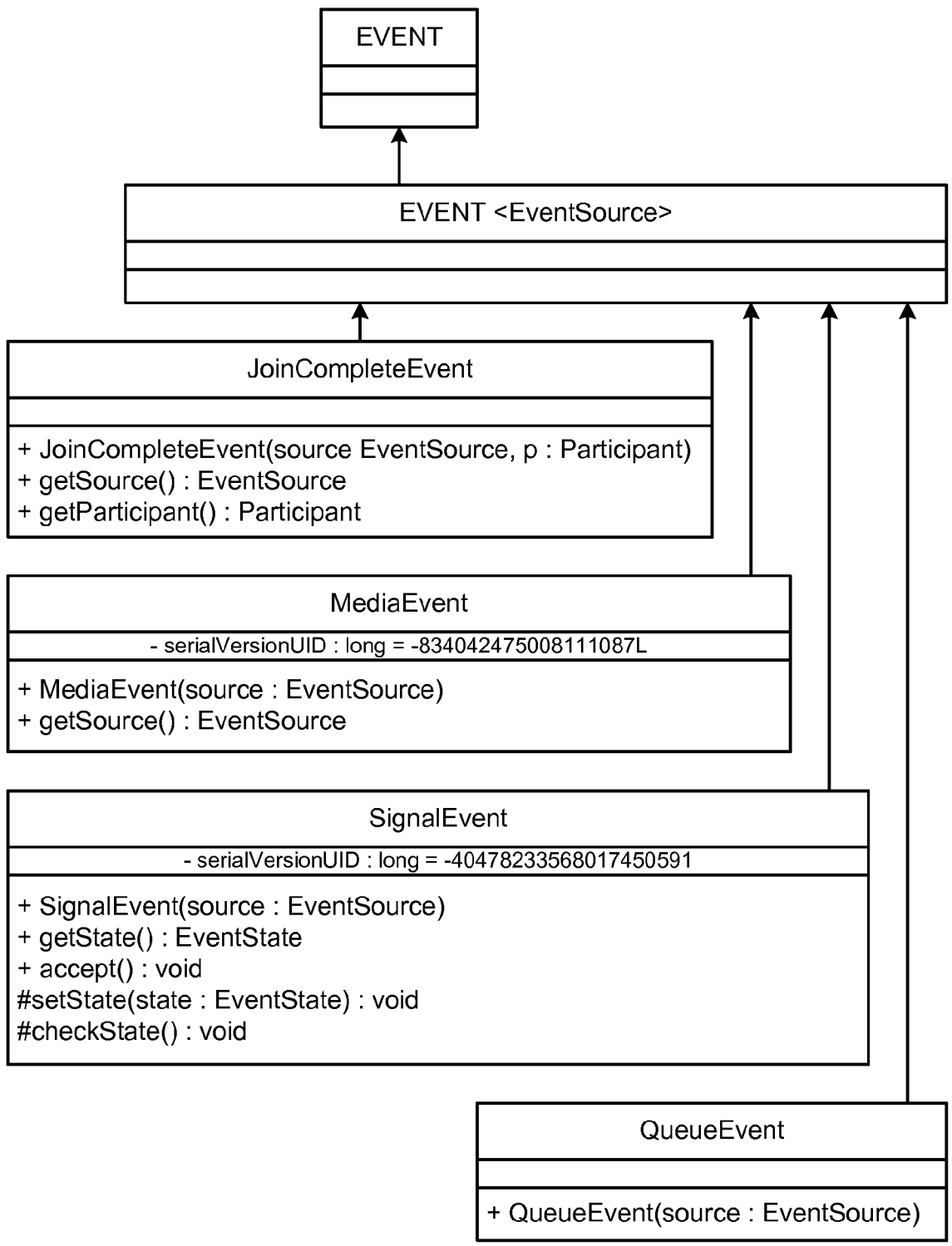
FIG. 11 illustrates the EventSource object in a UML diagram.

FIG. 11 illustrates the EventSource object in a UML diagram. The EventSource generates unified events from MediaEvent and SignalEvent objects.

Call controls can be performed on SignalEvent, such as accept. Almost all call control functions are modeled as synchronous methods for simplicity, given the fact that call control functions are finished within relative short time (e.g. max SIP timeout is about 32 seconds).

The media control functions, on the other hand, are modeled as asynchronous methods because media functions can be arbitrarily long. The result of any media function will be returned as MediaEvents. If an application wants to wait for a media function to complete before doing other actions. This can be easily achieved by Future.get( )since a media function returns a Future to allow call to query its status.

Each Call is an Event Source that can generate both SignalEvent and MediaEvent. To get notified, the application has to add an Observer or an EventListener to the Call.

Event programming usually is associated with state management. The unified communication framework supports application-defined state based event dispatching. Application can setApplicationState on each EventSource. Concurrent states are also supported by call setApplicationState. The unified communication framework will dispatch the event to the appropriate Observer method based on its State annotation.

Each EventSource mostly likely has system state driven by underlying protocols. But these should be separated from application states. Application states are simply symbolic names, entirely managed by application.

The example below shows how MyObserverClass handles different InputCompleteEvent at different states. greetingHandler is called when an InputCompleteEvent is fired by the EventSource and that EventSource's application state is "greeting". Similarly, supportHandler and salesHandler are called when InputCompleteEvent is fired by the EventSource and that EventSource's application state is "support" and "sales" respectively.

```
public class MyObserverClass implements Observer {
    @State("greeting")
    public void greetingHandler(InputCompleteEvent input) {
        String value = input.getConcept( );
        if (value.equals("support")) {
            input.getEventSource( ).setApplicationState("support");
            // play support menu and wait for input
        }
        else if (value.equals("sales")) {
            input.getEventSource( ).setApplicationState("sales");
            // play support menu
        }
        else {
            // replay greeting
        }
    }
    @State("sales")
    public void salesHandler(InputCompleteEvent input) {
        // handle sales input
    }
    @State("support")
    public void supportHandler(InputCompleteEvent input) {
        // handle support input
    }
}
```

Figure 12:
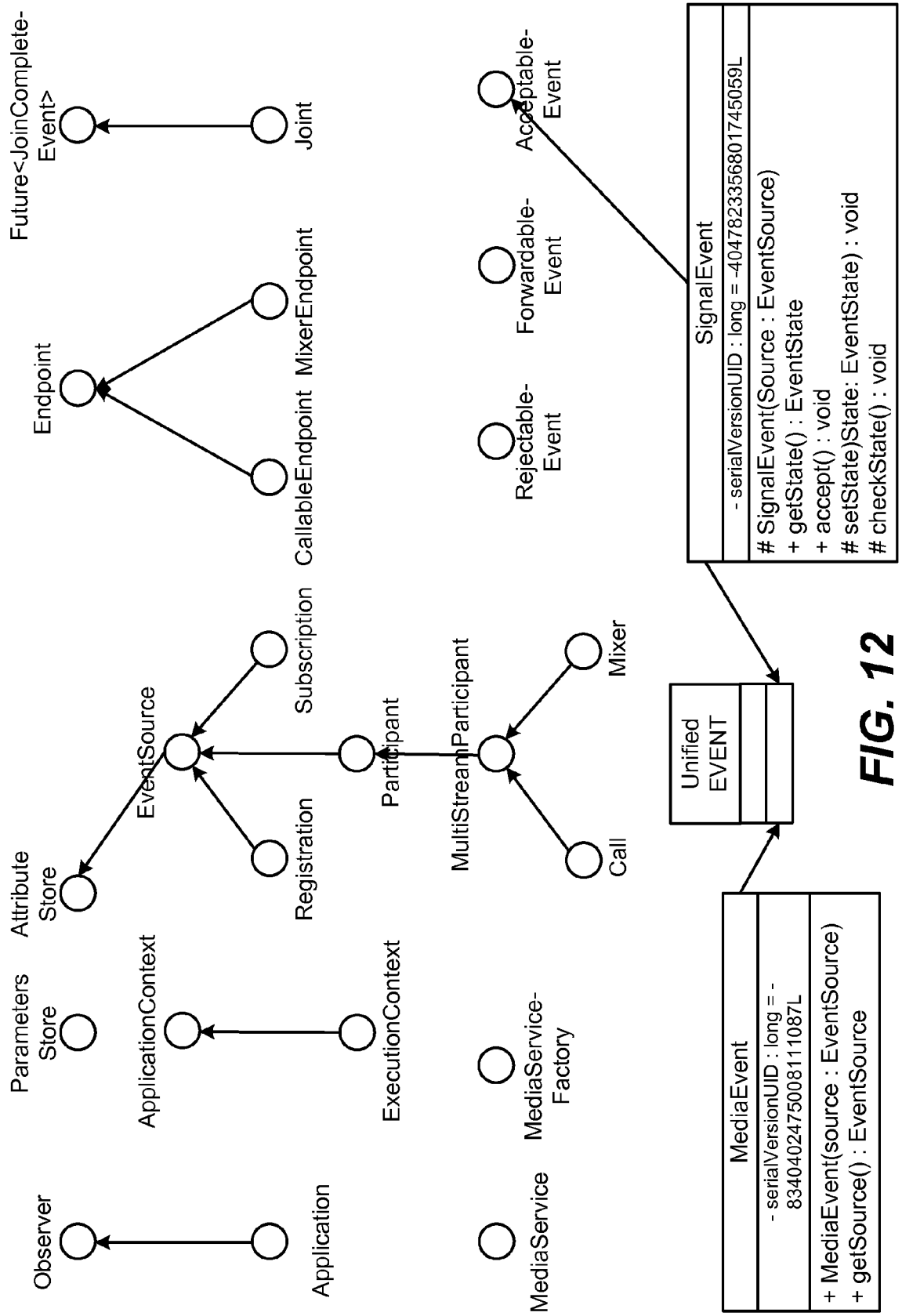
FIG. 12 illustrates the various classes in a preferred implementation of the unified communication framework.

FIG. 12 illustrates the various classes in a preferred implementation of the unified communication framework.

While the unified communication framework provides high-level, unified objects built from lower-level object of JSR 289/309, some of the unified objects can be mapped into JSR 289 or 309 objects, which allows the application to access the JSR 289/309 API directly. For example, Call is equivalent of SipSession in JSR 289 and NetworkConnection in JSR 309. MediaService is equivalent of MediaGroup in JSR 309. Mixer is equivalent of Mixer in JSR 309. In order to prevent lower level access from messing up the states in the unified framework, the lower level objects are to be accessed via preferably proxy objects.

The unified communication framework Package is a simply Java ARchive (JAR). A container supports loading the unified package should scan the package to find and load the implementation class of the Application interface. If multiple implementation classes exist, the implementation class can be designated by JAR's Manifest with an Application-Class entry. Otherwise, a random implementation class is loaded. If a JSR-289 container doesn't support loading the unified package directly, the unified communication framework should be packaged as standard SAR.

The following is an example of how compact the codes can be for an IVR application in the unified communication framework. The application developer needs not be concerned with low level controls and protocols and can simply focus on the business logic.

```
package com.voxeo.ufw.sample;
import com.voxeo.ufw.Application;
import com.voxeo.ufw.ApplicationContext;
import com.voxeo.ufw.Call;
import com.voxeo.ufw.MediaService;
import com.voxeo.ufw.State;
import com.voxeo.ufw.event.InputCompleteEvent;
import com.voxeo.ufw.event.InviteEvent;
public class IVR implements Application {
    @Override
    public void init(final ApplicationContext ctx) {
    }
    @Override
    public void destroy( ) {
    }
    @State
    public void handleInvite(final InviteEvent inv) throws
    Exception {
        final Call call = inv.acceptCall(this);
        call.join( ).get( );
        call.setApplicationState("menu-level-1");
        final MediaService mg = call.getMediaService(false);
        mg.prompt("1 for sales, 2 for support", "1,2", 0);
    }
    @State("menu-level-1")
    public void menu1(final InputCompleteEvent evt) {
        switch (evt.getCause( )) {
            case MATCH:
                final Call call = (Call) evt.getSource( );
                if (evt.getConcept( ).equals("1")) {
                    call.setApplicationState("menu-level-2-1");
                    call.getMediaService(false).prompt("1 for
                    sipmethod, 2 for prophecy," "1,2", 0);
                }
                else {
                    call.setApplicationState("menu-level-2-2");
                    call.getMediaService(false).prompt("1 for
                    sipmethod, 2 for prophecy," "1,2", 0);
                }
                break;
        }
    }
    @State("menu-level-2-1")
    public void menu21(final InputCompleteEvent evt) {
        switch (evt.getCause( )) {
            case MATCH:
                final Call call = (Call) evt.getSource( );
                if (evt.getConcept( ).equals("1")) {
                    call.setApplicationState("menu-simpmethod-sales");
                    call.getMediaService(false).prompt("thank you for
                    calling sipmethod sales", null, 0);
                }
                else {
                    call.setApplicationState("menu-prophecy-sales");
                    call.getMediaService(false).prompt("thank you for
                        calling prophecy sales", null, 0);
                }
                break;
        }
    }
    @State("menu-level-2-2")
    public void menu22(final InputCompleteEvent evt) {
    'switch (evt.getCause( )) {
        case MATCH:
            final Call call =(Call) evt.getSource( );
            if (evt.getConcept( ).equals("1")) {
                call.setApplicationState("menu-simpmethod-support");
```

-continued

```
                call.getMediaService(false).prompt("thank you for
                calling sipmethod support", null, 0);
            }
            else {
                call.setApplicationState("menu-prophecy-support");
                call.getMediaService(false).prompt("thank you for
                calling prophecy support", null, 0);
            }
            break;
        }
    }
}
```

Communication Service Having a Message-Based API

As described above in connection with FIG. 1 to FIG. 12, communication services are provided by one or more servers that are enabled for call control and media control. This allows voice clients to interact with a communication application deployed on the application platform 100.

The application platform facilitates operations of the call and media services by providing a unified framework for programming. The unified framework provides a unified API that gives access to a set of unified class objects for call control and media control. The unified class objects are constructed from lower level class object primitives of individual standards-base Java call control API and media control API. The constructs are a structured and restricted set conforming to the object model of a typical communication application and its states. In particular a unified event model conforming to the object model allows programming to be simplified so that the script can be focused on the business logic rather than the lower level protocol. Furthermore, the higher level, unified class objects have well-defined behaviors which are conducive to a more stable operating environment.

Figure 1:
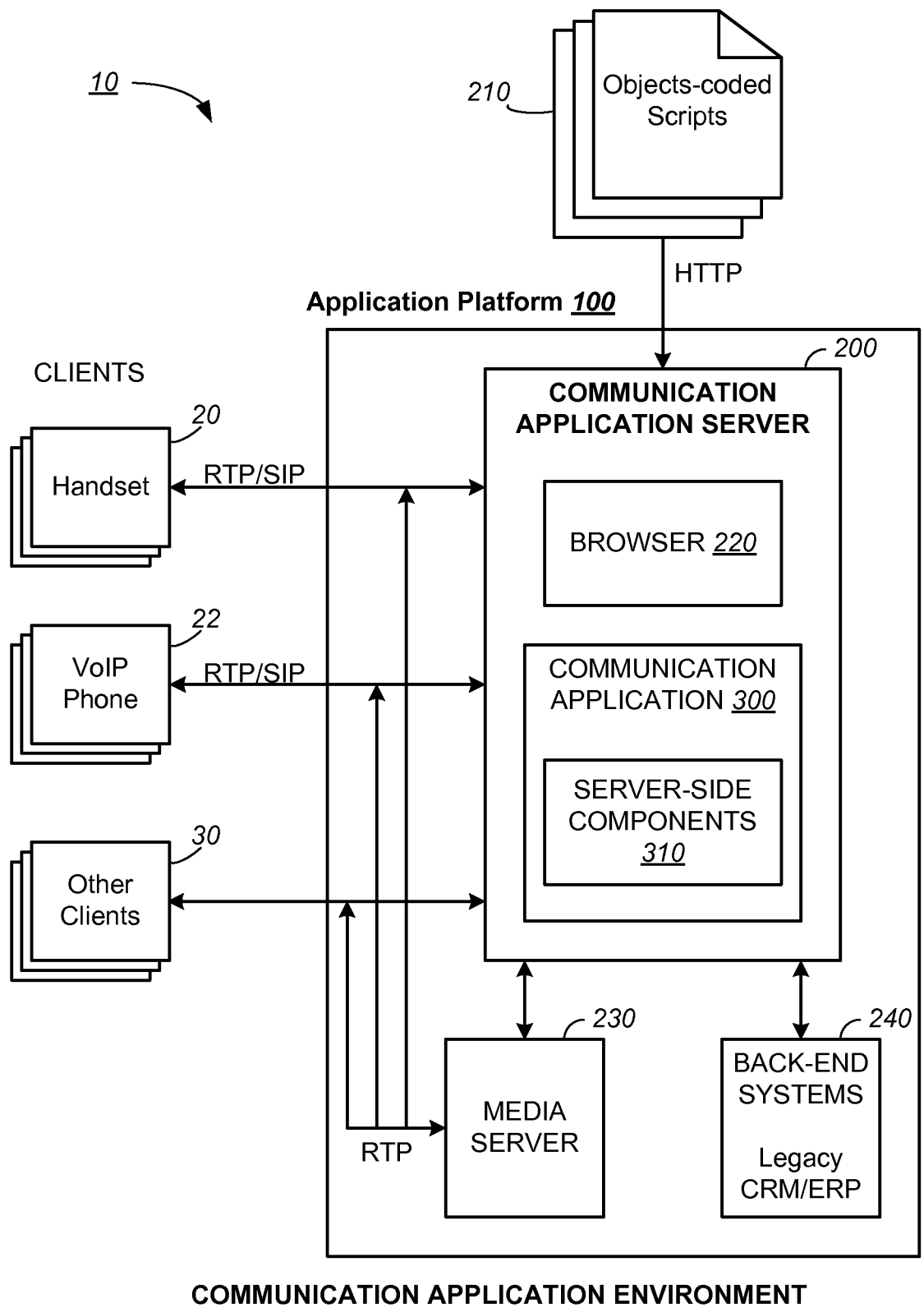
FIG. 1 illustrates schematically a communication application environment.
Figure 2A:
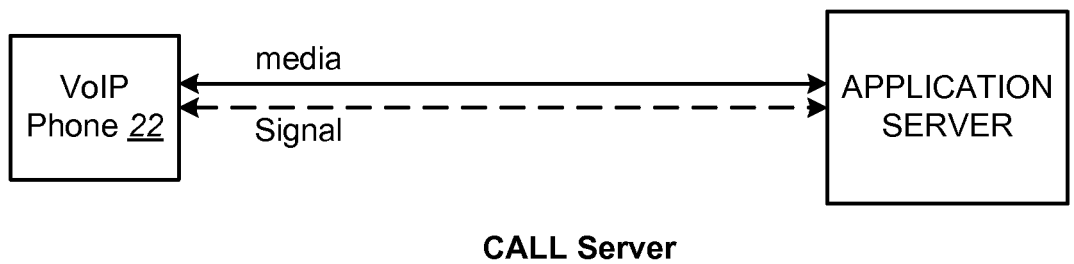
FIG. 2A illustrates a client in the form of a VoIP phone calling the communication application server.
Figure 2B:
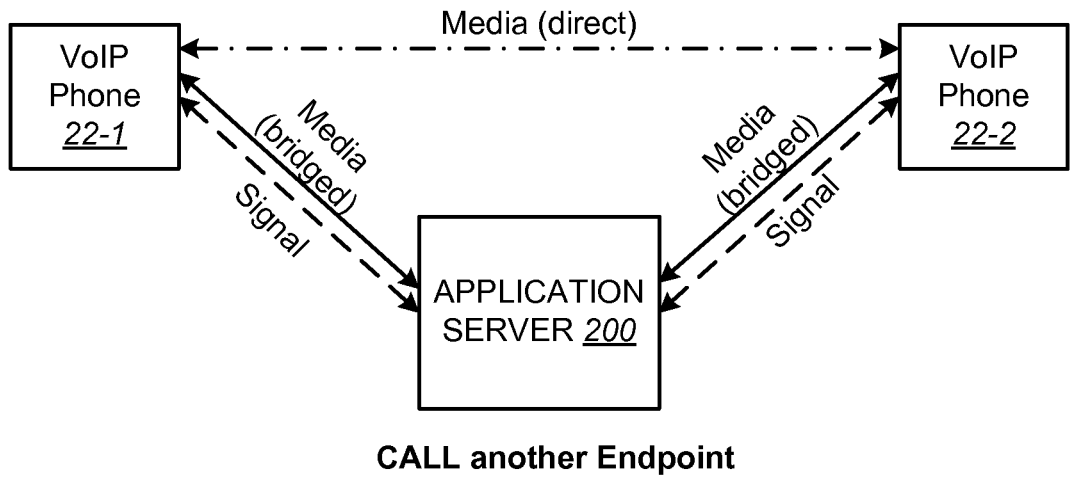
FIG. 2B illustrates a first VoIP phone calling a second VoIP phone.
Figure 2C:
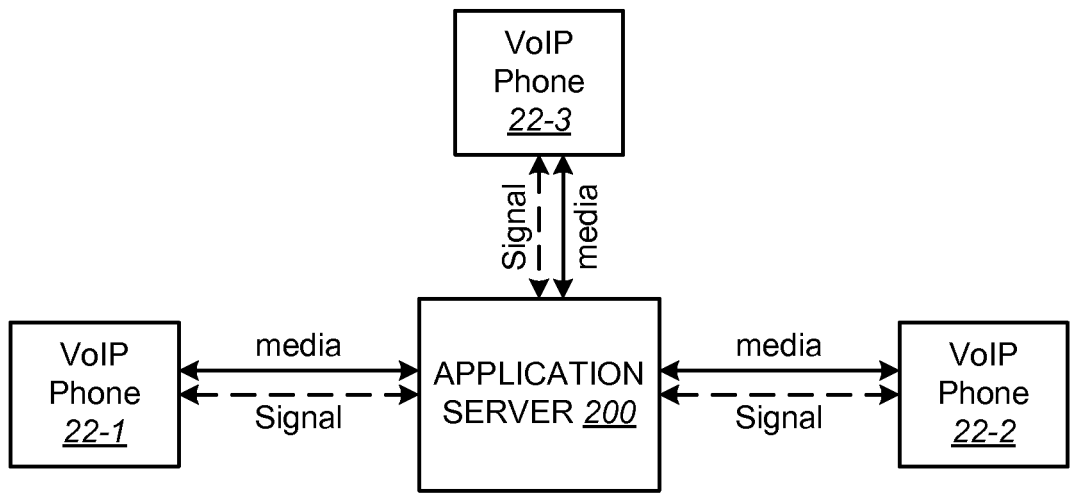
FIG. 2C illustrates three phones in conference.

For example, as shown in FIG. 1, an application developer is able to construct a communication application by providing an application script 210 to drive the communication application server 200 in the application platform 100. The application script 210 is typically scripted in a language such as Java or JavaScript. Through the action of a browser 200 supporting such a language, the application script is interpreted or compiled into execution codes which are then executed in a Java virtual machine of the communication application server 200. The execution codes include application program logic and commands that invoke and manipulate the unified class objects through the unified API as shown in FIG. 4.

Figure 13:
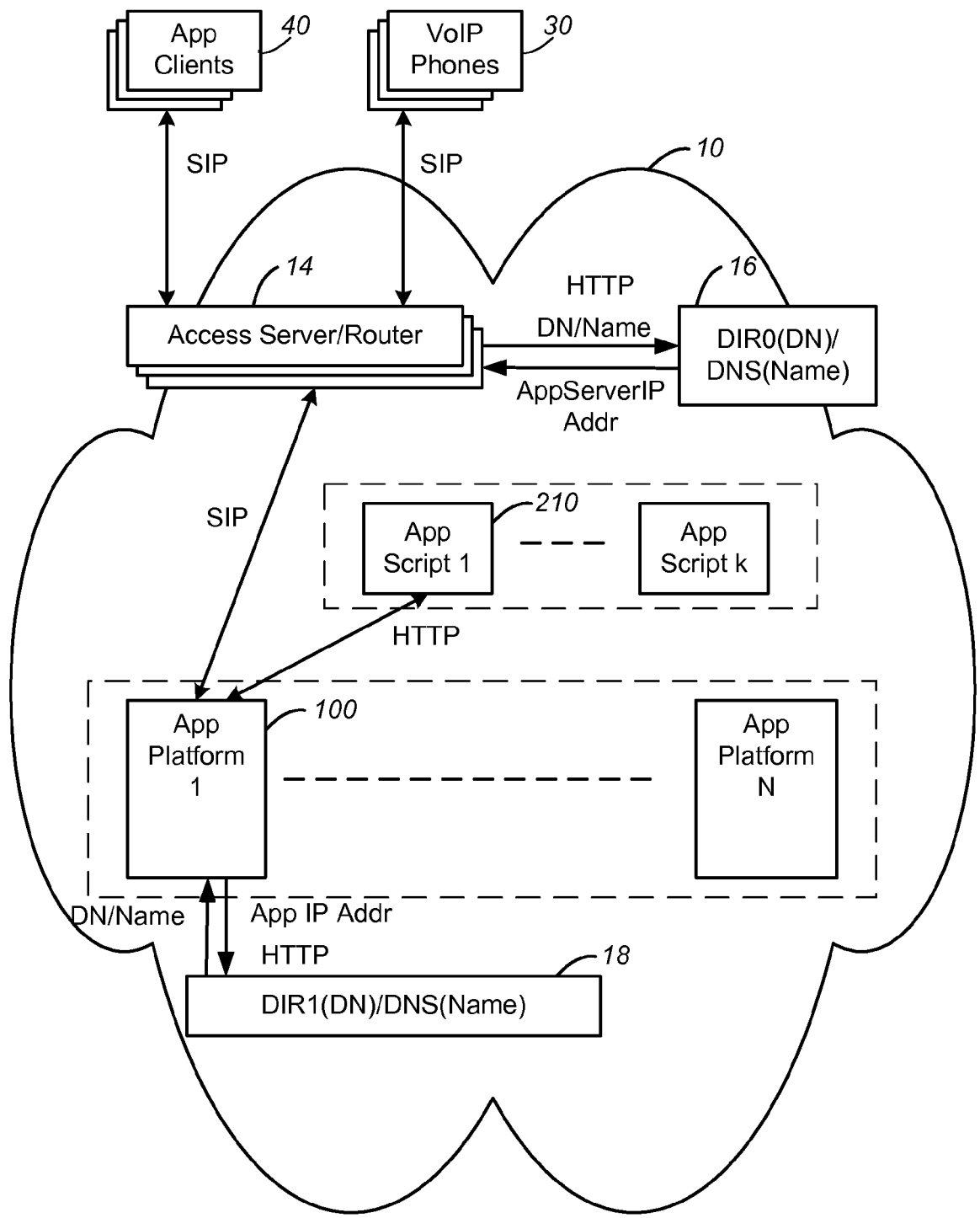
FIG. 13 illustrates a typical implementation of deploying communication applications on an IP network such as the internet.

FIG. 13 illustrates a typical implementation of deploying communication applications on an IP network such as the internet. A plurality of application platforms 100 is deployed on the network to provide communication services when hosting any number of communication applications defined by the application scripts 210. Clients such as VoIP phones 30, application clients 40 and other terminal equipment is able to access a specific communication application by calling a dialed number or an URL. The call is routed by an access server/router 14 into the IP network 10 to an application platform, such as application platform 1. The routing is performed by looking up a directory service DIR0 16 with the IP address/dialed number in order to return the address of an available application platform with the necessary resources to execute the specific communication application. Once application platform 1 is selected, the application server in the platform will retrieve the application script 210 for the specific application associated with the dialed number. This is accomplished by looking up another directory service DIR1

18 for a pointer to the URL of the application script. For example, the dialed number may be associated with application script 1 and it is retrieved into the application platform 1.

Once the "dialed" application script 1 is retrieved into the application platform 1, the application server 200 (see also FIG. 1 and FIG. 4) will process the script. First a browser, compatible with the language the script, will interpret or compile the script into execution codes which will invoke the class objects and make function calls to the unified API. The execution is performed in a Java virtual machine supported by the application server 200.

In this manner, communication applications such as voicecenters, IVR, voice-enabled self-help applications web bots can be deployed by such an application platform on the internet by leveraging web-like technologies and practices and employing standards-based protocol and languages. Variations of such communication platforms and network architecture of communication resources have been disclosed in U.S. Pat. No. 6,922,411, United States Patent Application Publication No. US 2011/0046960, and U.S. patent application Ser. No. 13/088,396 filed on Apr. 17, 2011, the entire disclosure of said publications and Applications are incorporated herein by reference.

The architecture described in FIG. 13 has the script processing or scripting performed by the server that is also executing the resultant execution codes. The scripting is language- and protocol-specific, such as for example, processing a script written in the Java or JavaScript language.

However, increasingly users and application developers are using other light-weight protocols and languages to code the application scripts. These include Ruby, Python, Groovy and PHP. With a growing range of languages and protocols, it is difficult for a hosting facility to provide compatible browsers (see FIG. 1) for each of the possible programming languages and protocols.

Even if a large number of browsers is supported, the resultant execution codes from these different browsers will all run in the same Java virtual machine of the application server. Without a standard protocol to the unified API, the different scripts running in the same virtual machine may contend with each other, resulting in poor performance, memory leaks and, worst still, object collisions. Also, having to support a wide set of possible scripts make resource provisioning and budgeting in the communication platform difficult and indefinite.

Accordingly, there is a need to provide a more flexible arrangement for telephony services and communication application deployment to be driven by scripts coded with a variety of user-preferred programming languages and protocols without the above-mentioned disadvantages.

According to a general aspect of the invention, a communication application server is provided with a unified framework for call control and media control. The framework supports a unified API having class objects and functions conforming to a telephony object model. The class objects are invoked and manipulated by a finite set of commands and an application program essentially issues a series of such commands to operate the communication application server. More particularly, an API server on the communication application server defining a messaging API protocol enables an application script to pass commands remotely to the communication application server to operate it. This allows application scripts to be processed remotely by appropriate scripting engines. The resulting execution codes from the scripting are expressed in terms of the commands of the finite set, which are then sent to the communication application server. The API server at the communication application server parses out the commands from the messages to have the communication application server executes the commands as they are available for execution.

In a preferred embodiment, the communication application server is among a group of similar communication application servers on the network to provide telephony and communication services to a plurality of customers with application scripts hosted on scripting engines. One or more communication API gateway for the group of communication application servers is deployed on the network to serve as a messaging broker between the plurality of customers with application scripts and the group of communication application servers.

In a preferred embodiment, the scripting engine and the application server communicate by messaging via a bidirectional connection, such as under the XMPP protocol.

XMPP refers to Extensible Messaging and Presence Protocol and it is a set of open XML technologies for presence and real-time communication developed by the Jabber opensource community in 1999.

In this way, application scripting is decoupled from the operation of the communication application server, which only needs to focus on providing basic communication services. A customer using the communication services can code the application script in a preferred programming language using a custom framework providing a set of customer-specific libraries. Scripting can be performed by third party scripting engines. The resulting execution codes only need be expressed in terms of the finite set of commands and sent as messages to operate the communication application server.

Figure 14:
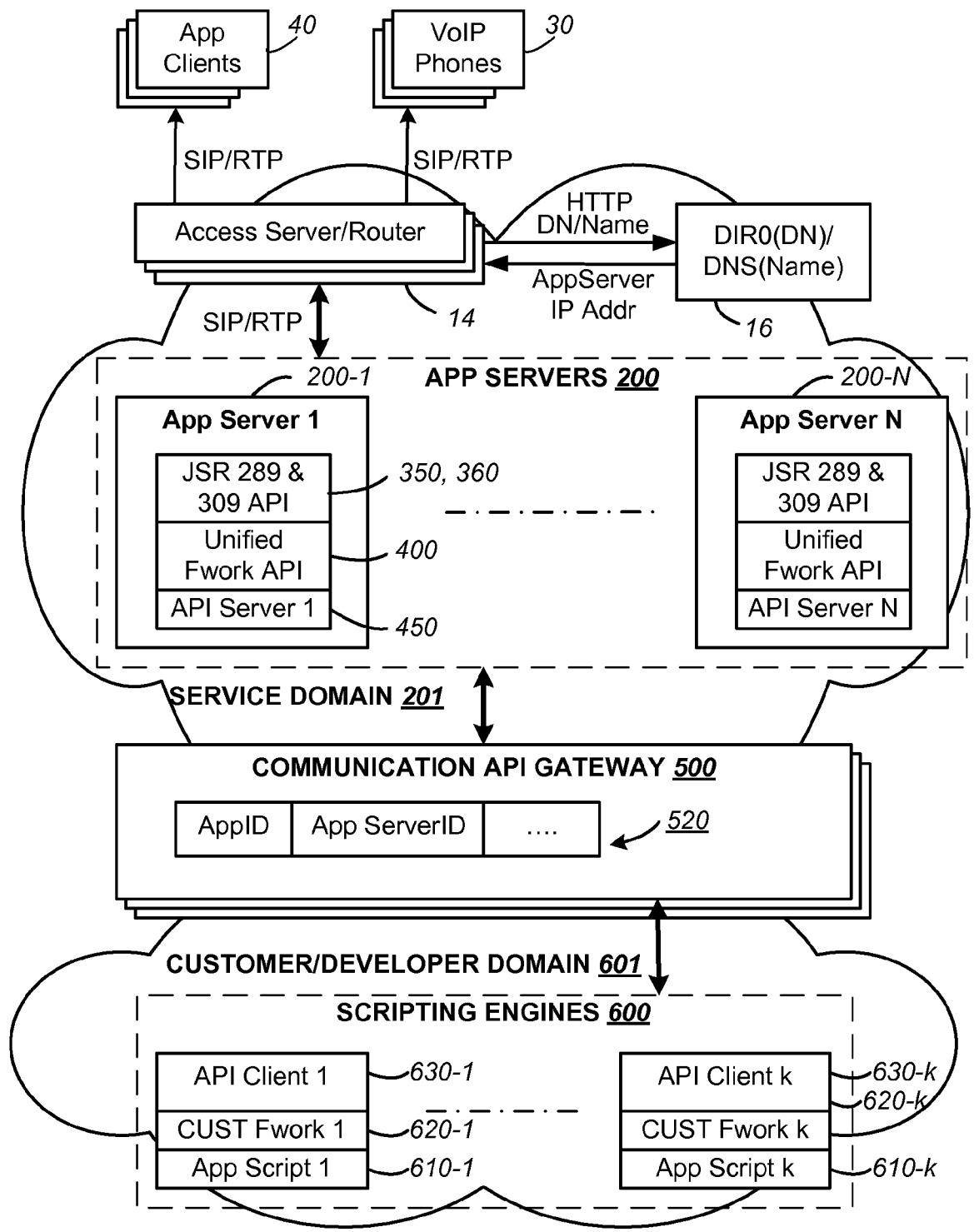
FIG. 14 illustrates a network architecture suitable for practicing the present invention.

FIG. 14 illustrates a network architecture suitable for practicing the present invention. Essentially, the network is considered as comprising a service domain 201 and a customer/developer domain 601.

In the service domain 201 is a plurality of communication application servers 200, such as App Server 1 to App Server N. As in FIG. 13, the communication application servers 200 provide telephony and communication services to applications and allows application clients 40 such as, for example, VoIP phones to access the applications hosted in the communication application servers.

Similar to that shown in FIG. 13, application clients such as VoIP phones 30, is able to access a specific communication application by calling a dialed number or an URL. The call is routed by an access server/router 14 into the IP network 10 to one of the communication application servers 200, such as App server 1. The routing is performed by looking up a directory service DIR0 16 with the IP address/dialed number in order to return the address of the communication application server executing the specific communication application.

Each communication application server 200 comprises a virtual machine for executing codes with access to the unified communication API of the unified communication framework 400 as described in connection with FIG. 4 above. The unified communication framework 400 is a further abstraction of a basic call control API and media control API. In the preferred embodiment, the call control API is the implementation of a standards-based SIP servlet container 340 and a SIP servlet call control API 350, and the media control API is implemented by a standards-based media control API, JSR 309 as shown in FIG. 3A.

Unlike that shown in FIG. 13, the communication application server 200 does not proceed to retrieve a script for the specific communication application, and process the script and execute the resulting execution codes. Instead, it exposes the unified communication framework API 400 as a finite set of commands through an API server 450 to the network. This is accomplished by providing a messaging API protocol for customers of the communication application server on the network to execute their applications as a series of these commands.

On the other hand, in the customer/developer domain 601 is a plurality of scripting engines 600 for the customers to host and process the customers' application scripts 610. For example, a customer 1 has the scripting engines 600 host and process an application script such as App Script 1 610-1. The processing of App Script 1 is facilitated by a customer-specific framework 620, such as CUST Fwork 1 620-1 which supplies a set of customer-specific libraries. The processing is performed by an API client 630 such as API client 1 630-1 which interprets App Script 1 and renders it in terms of the commands of the finite set defined at the API server 450 of the communication application server 200. The API client 630 then packages the commands as messages in accordance with the messaging API protocol to be sent to a connected communication application server 200 such as App server 1 200-1.

In a preferred embodiment, one or more communication API gateway 500 is deployed on the network to serve as a messaging broker between the plurality of customers with application scripts in the customer/developer domain 601 and the group of communication application servers 200 in the service domain 201.

In a preferred embodiment, the messaging is via a bidirectional connection between the two domains, such as under the XMPP protocol. Other message exchange protocols such as Active MQ, RabbitMQ are also contemplated.

Thus, the communication application server 200 communicates with the scripting engines 600 using a messaging API protocol. When a command carried in a message is received at the communication application server 200, the API server 450 will parse out the command in accordance with the messaging API protocol and allow the command to be queued with the associated call (actor) to be executed.

Figure 15:
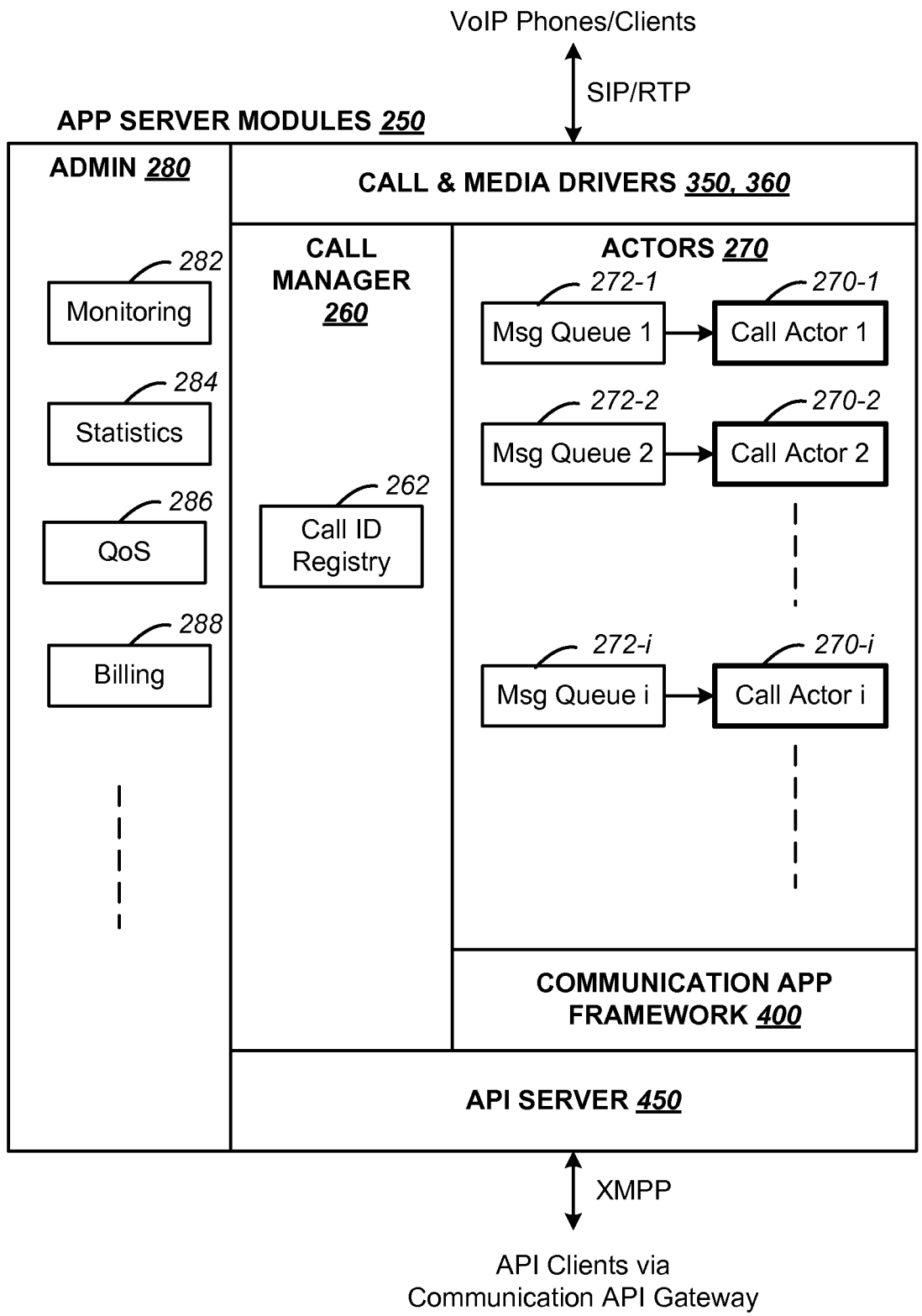
FIG. 15 illustrates the main modules of the communication application server.

FIG. 15 illustrates the main modules of the communication application server. The communication application server 200 shown in FIG. 14 supports a Java virtual machine that maintains a number of software modules 250 including a call manager 260, actors 270, Admin 280 in addition to the communication application framework 400, call and media control drivers 350, 360 and the API server 450 described earlier.

The call manager 260 manages the cooperation among the modules. When a call 1 is received into the communication application server 200, the call manager register the Call ID into a call ID registry 262 and start a call actor 1 270-1, and similarly for call 2, . . . , and call i. As command messages from the API clients 630 (see FIG. 14) are received by the application server 200, they are identified with a call actor and queued in an associated message queue 272, which are then applied to the call in order. As will be described in more detail later, the API server parses out the command in each message for execution in turn on the associate call actor.

The admin module 280 includes sub modules such as a monitoring module 282, a statistics modules 284, a QoS (Quality of Service) modules 286 and Billing module 288.

Figure 16:
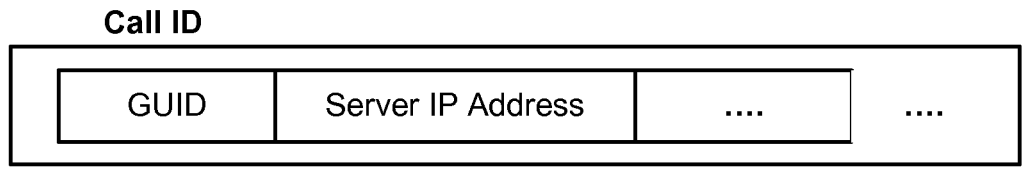
FIG. 16 illustrates in more detail the callID stored in the callID registry shown in FIG. 15.

FIG. 16 illustrates in more detail the callID stored in the callID registry shown in FIG. 15. Essentially it includes a GUID (Globally Unique Identifier) and a server IP address. In this way, the call and the handling communication application server are readily identified.

Figure 17:
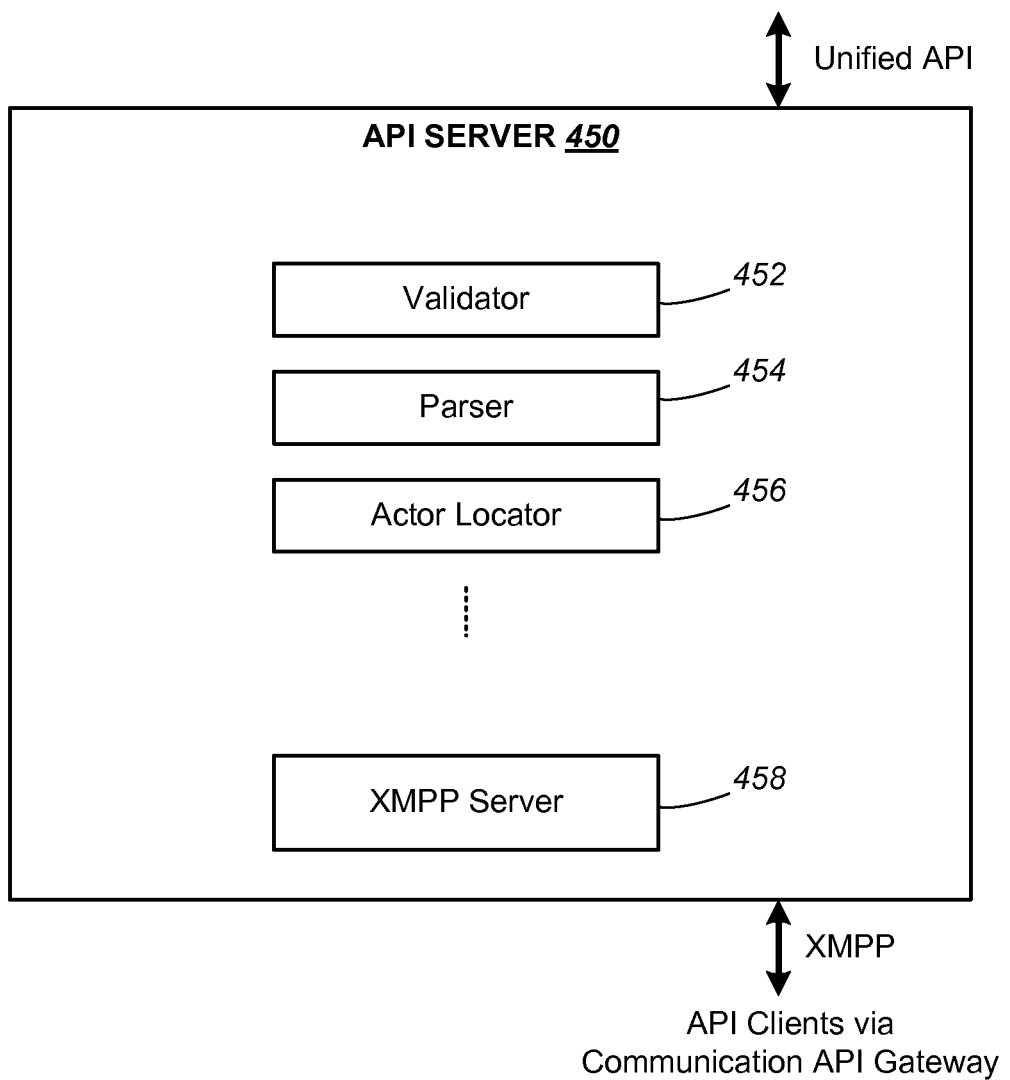
FIG. 17 illustrates in more detail the API server module shown in FIGS. 14 and 15.

FIG. 17 illustrates in more detail the API server module shown in FIGS. 14 and 15. The API server module 450 includes a validator 452, a parser 454, an actor locator 456 and a messaging server 458. When a message is received into the communication application server 200, the validator validates the message for it conformity to the API messaging protocol and whether the embedded command is one from the finite set of commands supported by the unified framework API 400. A validated message is then parsed to extract the embedded command and any parameters. The actor locator 456 identify the call the message is directed to and queue the command and any parameters in the message queue 272 of the associate call actor 270.

In a preferred embodiment, the messaging is conducted under the XMPP protocol. In this case, an XMPP server is provided as the messaging server 458. This will facilitate exchange of messages with API clients 630 in the customer/developer domain 601.

Figures 18, 19:
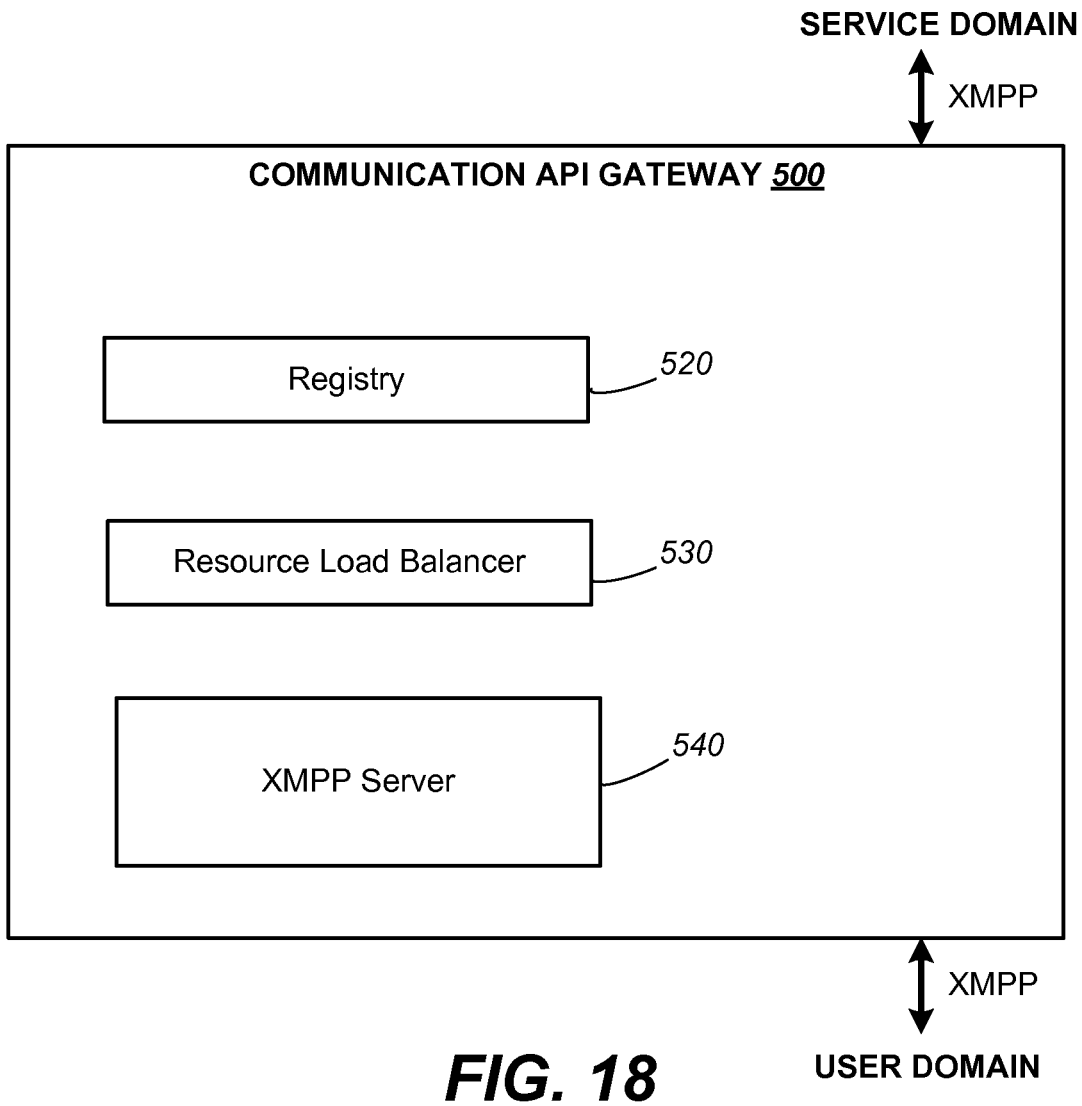
FIG. 18 illustrates in more detail the communication API gateway shown in FIG. 14.
FIG. 19 illustrates the main information maintained in the registry of the communication API gateway.

FIG. 18 illustrates in more detail the communication API gateway shown in FIG. 14. One or more communication API gateway 500 serves as a messaging broker between the plurality of customers with application scripts in the customer/developer domain 601 and the group of communication application servers 200 in the service domain 201. The communication API gateway includes a registry 520, a resource load balancer 530, and a messaging server 540. The resource load balance 530 is responsible for locating a communication application server 200 best suited for executing the commands from a given API client 630. In the preferred embodiment, the messaging server 540 is an XMPP server. Messaging under the XMPP protocol is expedient in that the persistent connection is more conducive to the call environment. Also, it has well developed protocol and facilities for federation between different messaging domains.

FIG. 19 illustrates the main information maintained in the registry of the communication API gateway. The XMPP server 540 in the communication API gateway 500 mediates between the plurality of communication application servers 200 (each having an XMPP server 458) in the service domain 201 and the plurality of API clients 630 (each having an XMPP client not shown explicitly). The XMPP server 540 conducts federation by referencing the information in the registry 520, which registers the communication application servers 200 in the service domain and the customers' applications in the customer/developer domain 601. Also logged are the properties and status associated with each communication application server 200 and the properties and status associated with each API clients 630.

Figure 20:
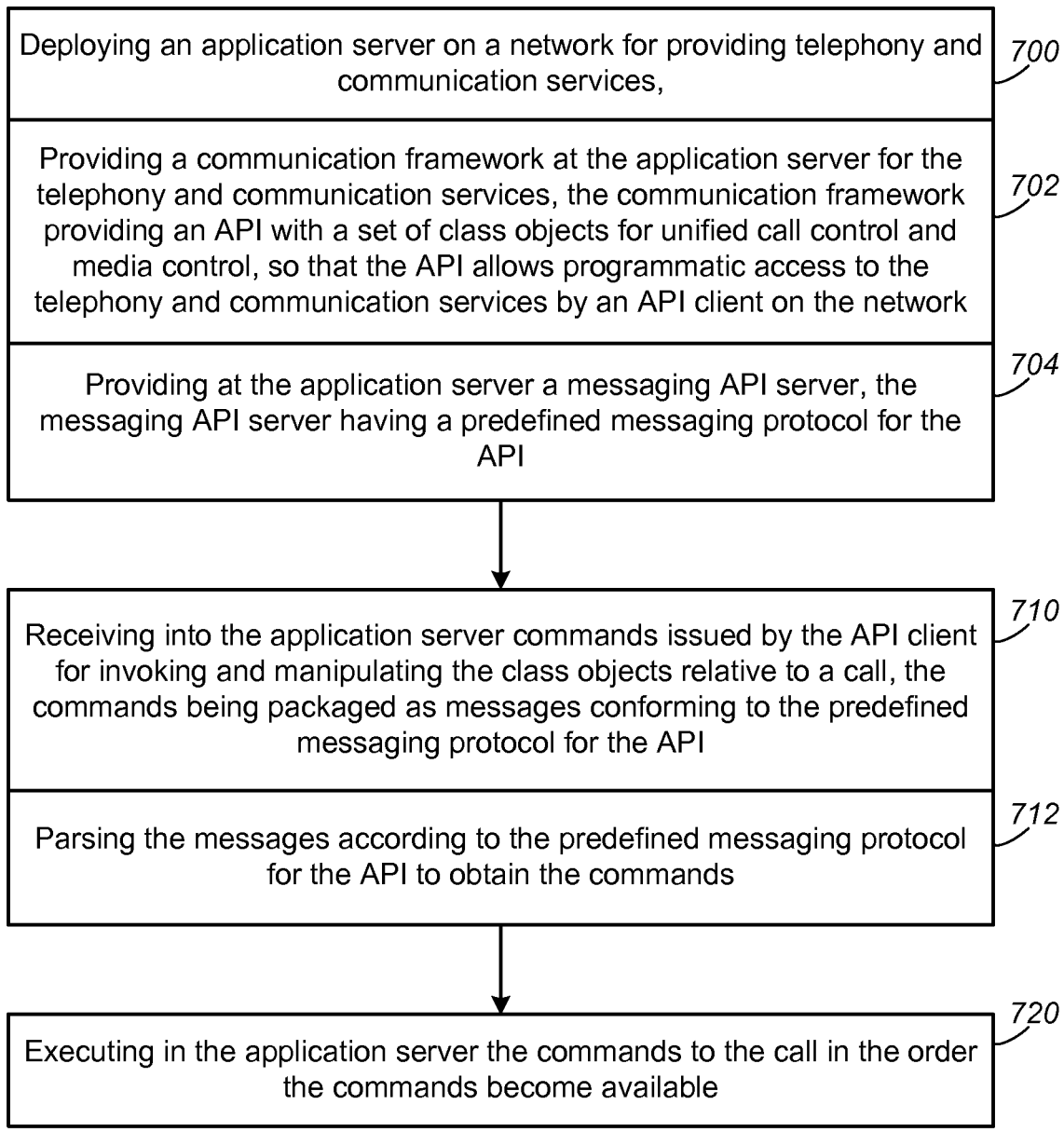
FIG. 20 is a flow diagram of a method of operating the communication application server.

FIG. 20 is a flow diagram of a method of operating the communication application server.

STEP 700: Deploying an application server on a network for providing telephony and communication services.
STEP 702: Providing a communication framework at the application server for the telephony and communication services, the communication framework providing an API with a set of class objects for unified call control and media control, so that the API allows programmatic access to the telephony and communication services by an API client on the network.
STEP 704: Providing at the application server a messaging API server, the messaging API server having a predefined messaging protocol for the API
STEP 710: Receiving into the application server commands issued by the API client for invoking and manipulating the class objects relative to a call, the commands being packaged as messages conforming to the predefined messaging protocol for the API
STEP 712: Parsing the messages according to the predefined messaging protocol for the API to obtain the commands
STEP 720: Executing in the application server the commands to the call in the order the commands become available.

Sample Specification of the Messaging API Protocol

The following are examples of the commands supported by the unified framework API 400 through the API server 450 and a specification of the messaging API protocol (hereinafter referred to as the "Rayo™" protocol).

Calls

The Rayo protocol primarily deals with calls. Inbound calls originate from the PSTN or via SIP and are offered to Rayo clients via XMPP using a Jabber Identifier (JID). Each call is in turn represented by its own unique JID allowing a two way conversation between the Rayo client and the server that's handling the call signaling and media.

JID Format

The JID follows a specific format. In XMPP the JID is constructed as

<node>@<domain>/<resource>

For Rayo, the <node> portion of the JID always represents the call ID. The <resource>, when present, represents the affected command ID.

Incoming Calls

```
<!-- Message comes from the Call's JID -->
<presence to='16577@app.Rayo.net/1'
  from='9f00061@call.Rayo.net/1'>
    <offer xmlns='urn:xmpp:Rayo:1'
        to='tel:+18003211212'
        from='tel:+13058881212'>
      <!-- Signaling (e.g. SIP) Headers -->
      <header name=' Via' value='192.168.0.1' />
      <header name='Contact' value='192.168.0.1' />
    </offer>
</presence>
```

The Rayo client can now control the call by using one of the following commands.

```
<!-- Accept (e.g. SIP 180/Ringing). Only applies to
incoming calls. -->
<iq type='set' to='9f00061@call.Rayo.net/1'
from='16577@app.Rayo.net/1'>
   <accept xmlns='urn:xmpp:Rayo:1'>
     <!-- Sample Headers (optional) -->
     <header name="x-skill" value="agent" />
     <header name="x-customer-id". value="8877" />
   </accept>
</iq>
<!-- Answer (e.g. SIP 200/OK). Only applies to
incoming calls. -->
<iq type='set' to='9f00061@call.Rayo.net/1'
from='16577@app.Rayo.net/1'>
   <answer xmlns='urn:xmpp:Rayo:1'>
     <!-- Sample Headers (optional) -->
     <header name="x-skill" value="agent" />
     <header name="x-customer-id" value="8877" />
   </answer>
</iq>
<!-- Redirect(e.g. SIP 302/Redirect). Only applies
to incoming calls. -->
<iq type='set' to='9f00061@call.Rayo.net/1'
from='16577@app.Rayo.net/1'>
   <redirect to='tel:+14152226789' xmlns='urn:xmpp:Rayo:1'>
     <!-- Sample Headers(optional) -->
     <header name="x-skill" value="agent" />
     <header name="x-customer-id" value="8877" />
   </redirect>
</iq>
```

A call can also be rejected. Rejections can include an optional rejection reason. Rejection reasons are one of <busy/>, <decline/> or <error/>. If not specified, <decline/> is used as the default reason.

```
<!-- Decline (.g. SIP 603/Decline). Only applies to
incoming calls. -->
<iq type='set' to='9f00061@call.Rayo.net/1'
from='16577@app.Rayo.net/1'>
   <reject xmlns='urn:xmpp:Rayo:1'>
     <decline />
     <!-- Sample Headers (optional) -->
     <header name="x-reason-internal" value="bad-skill" />
   </reject>
</iq>
<!-- Busy (.g. SIP 486/Busy). Only applies
to incoming calls. -->
<iq type='set' to='9f00061@call.Rayo.net/1'
from='16577@app.Rayo.net/1'>
   <reject xmlns='urn:xmpp:Rayo:1'>
     <busy />
     <!-- Sample Headers (optional) -->
     <header name="x-busy-detail" value="out of licenses" />
   </reject>
</iq>
<!-- Error (.g. SIP 500/Internal Server Error). Only applies
to incoming calls. -->
<iq type='set' to='9f00061@call.Rayo.net/1'
from='16577@app.Rayo.net/1'>
   <reject xmlns='urn:xmpp:Rayo:1'>
     <error />
     <!-- Sample Headers (optional) -->
     <header name="x-error-detail" value="soem descriptive
error message" />
   </reject>
</iq>
```

Outbound Calls

Rayo clients can initiate outbound calls using the <dial/> command.

```
<!-- Handled by the domain controller which picks
a random Rayo Server -->
<iq type='set' to='call.Rayo.net'
from='16577@app.Rayo.net/1'>
   <dial to='tel:+13055195825' from='tel:+14152226789'
xmlns='urn:xmpp:Rayo:1'>
     <header name="x-skill" value="agent" />
     <header name="x-customer-id" value="8877" />
   </dial>
</iq>
<iq type='result' to='16577@app:Rayo.net/1'
from='call.Rayo.net'>
   <!-- The Call's ID -->
   <ref id='9f00061' />
</iq>
```

The client will then begin to receive progress events as the call makes it's way through the network.

```
<!-- Far end has accepted the call and is
ringing (e.g. 180/Ringing) -->
<presence to='16577@app.Rayo.net/1'
from='9f00061@call.Rayo.net/1'>
   <ringing xmlns='urn:xmpp:Rayo:1' />
</presence>
<!-- The outgoing call has been answered (e.g. 200/OK) -->
<presence to='16577@app.Rayo.net/1'
from='9f00061@call.Rayo.net/1'>
   <answered xmlns='urn:xmpp:Rayo:1' />
</presence>
```

If for some reason the call is not accepted by the far end, the Rayo client will receive an <end/>event indicating the reason for the failure.

```
<!-- Dial destination did not answer within the
timeout period -->
<presence to='16577@app.Rayo.net/1'
  from='9f00061@call.Rayo.net/1'>
    <end xmlns='urn:xmpp:Rayo:1'>
       <timeout />
    </end>
</presence>
<!-- Dial destination is busy and annot answer the call -->
<presence to='16577@app.Rayo.net/1'
  from='9f00061@call.Rayo.net/1'>
    <end xmlns='urn:xmpp:Rayo:1'>
       <busy />
    </end>
</presence>
<!-- Dial destination rejected the call -->
<presence to='16577@app.Rayo.net/1'
  from='9f00061@call.Rayo.net/1'>
    <end xmlns='urn:xmpp:Rayo:1'>
       <reject />
    </end>
</presence>
<!-- Rayo encountered a system error while dialing -->
<presence to='16577@app.Rayo.net/1'
  from='9f00061@call.Rayo.net/1'>
    <end xmlns='urn:xmpp:Rayo:1'>
       <error>Lucy, you got some 'splainin to do</error>
    </end>
</presence>
```

Note:

A Rayo <end/> indicates that the call has been disconnected and that no more events are possible for this call. Therefore, the <end/>event is a perfect point for clients to clean up resources related to the controlling of the call.

Handling Caller Hangup

If the caller hangs up the call Rayo will produce an <end/> event with a <hangup/> reason like so:

```
<presence to='16577@app.Rayo.net/1'
  from='9f00061@call.Rayo.net/1'>
    <end xmlns='urn:xmpp:Rayo:1'>
       <hangup/>
    </end>
</presence>
```

Note:

A Rayo <end/> indicates that the call has been disconnected and that no more events are possible for this call. Therefore, the <end/>event is a perfect point for clients to clean up resources related to the controlling of the call.

Forcing a Call to End

Rayo client can force a call to end by sending a <hangup/> command to the call's JID.

```
<iq type='set' to='9f00061@call.Rayo.net/1'
  from='16577@app.Rayo.net/1'>
    <hangup xmlns='urn:xmpp:Rayo:1'>
       <!-- Sample Headers (optional) -->
       <header name="x-reason-internal" value="bad-skill" />
    </hangup>
</iq>
```

NOTE:

The client will still receive an <end/> event indicating that that call has been disconnected and that no further events or commands are possible.

Components

Components extend the Rayo protocol by providing additional media and call control functionality. Components are started by sending a specialized command to the Rayo server. This example shows the use of the <say xmlns='urn:xmpp:Rayo:say:1'/> component. The key point here is that a component request is being sent to the call's JID.

```
<iq type='set' to='9f00061@call.Rayo.net/1'
  from='16577@app.Rayo.net/1'>
    <say xmlns='urn:xmpp:Rayo:say:1'
      voice='allison'>
       <audio url='http://acme.com/greeting.mp3'>
          Thanks for calling ACME company
       </audio>
       <audio url='http://acme.com/package-shipped.mp3'>
          Your package was shipped on
       </audio>
       <say-as interpret-as='date'>12/01/2011</say-as>
    </say>
</iq>
```

NOTE:

one can easily spot a component request because the namespace will be in the format urn:xmpp:Rayo:COMPONENT_NAME:1

The Rayo server will validate the component request and attach a new instance of the component to the call. In a happy day scenario the client will immediately receive an IQ result containing the newly created component's ID. The component's ID is combined with the call's JID to control the component (e.g. pause, resume, stop, etc.) and to corelate events coming from the component as well.

A component's JID is calculated by combining the call's JID with the newly created component's ID like so:

```
<call-id>@<Rayo-domain>/<component-id>
<!-- Server responds a unique ID -->
<iq type='result' to=116577@app.Rayo.net/1'
  to='9f00061@call.Rayo.net/1'>
    <ref id='fgh4590' xmlns='urn:xmpp:Rayo:1' />
</iq>
```

NOTE:

Rayo executes components asynchronously and in many cases more than one component can run at the same time. For example, one can have the <record xmlns= ' ' /> component running throught the entire while you interact with the user using the "say" and "ask" components resulting in the entire call being recorded.

Component Commands

Components are controlled by sending command messages to their unique JID. The only command required by all components is the <stop/> command.

```
<iq type='set' to='9f00061@call.Rayo.net/fgh4590'
  from='16577@app.Rayo.net/1'>
    <stop xmlns='urn:xmpp:Rayo:1' />
</iq>
```

As will be seen later, component developers can get very creative with the command they support allowing for some really interesting capabilities. For example, the ability to pause and resume audio playback as well as muting and unmuting the caller's microphone while in a conference.

Component Events

Events are specialized lifecycle messages that flow from a component instance to the Rayo client that's controlling the call. As you'll see in the following chapters, component events are very powerful and can provide great insight into a running application.

The only event required by all components is the <complete xmlns='urn:xmpp:Rayo:eXt:complete:1'/>. This is an example complete event produced by the <say urn:xmpp:Rayo:say:1/> component when audio playback has completed successfully.

```
<presence to='9f00061@call.Rayo.net/fgh4590'
    from='16577@app.Rayo.net/1'>
    <complete xmlns='urn:xmpp:Rayo:ext:1'>
        <success xmlns='urn:xmpp:Rayo:say:complete:1'/>
    </complete>
</presence>
```

Say Component

```
<iq type='set' to='9f00061@call.Rayo.net/1'
    from='16577@app.Rayo.net/1'>
    <say xmlns='urn:xmpp:Rayo:say:1'
        voice='allison'>
        <audio url='http://acme.com/greeting.mp3'>
            Thanks for calling ACME company
        </audio>
        <audio url='http://acme.com/package-shipped.mp3'>
            Your package was shipped on
        </audio>
        <say-as interpret-as='date'>12/01/2011</say-as>
    </say>
</iq>
```

Commands

```
<!-- Client pause the say -->
<iq type='set' to='9f00061@call.Rayo.net/fgh4590'
    from='16577@app.Rayo.net/1'>
    <pause xmlns='urn:xmpp:Rayo:say:1'/>
</iq>
<!-- Client resumes the say -->
<iq type='set' to='9f00061@call.Rayo.net/fgh4590'
    from='16577@app.Rayo.net/1'>
    <resume xmlns='urn:xmpp:Rayo:say:1'/>
</iq>
```

Events

```
<!-- Playback completed successfully -->
<presence to='16577@app.Rayo.net/1'
    from='9f00061@call.Rayo.net/fgh4590'>
    <complete xmlns='urn:xmpp:Rayo:ext:1'>
        <success xmlns='urn:xmpp:Rayo:say:complete:1'/>
    </complete>
</presence>
<!-- Component was stopped -->
<presence to='16577@app.Rayo.net/1'
    from='9f00061@call.Rayo.net/fgh4590'>
    <complete xmlns='urn:xmpp:Rayo:ext:1'>
        <stop xmlns='urn:xmpp:Rayo:ext:complete:1'/>
    </complete>
</presence>
<!-- Component completed because the call was disconnected -->
<presence to='16577@app.Rayo.net/1'
    from='9f00061@call.Rayo.net/fgh4590'>
    <complete xmlns='urn:xmpp:Rayo:ext:1'>
        <hangup xmlns='urn:xmpp:Rayo:ext:complete:1'/>
    </complete>
</presence>
<!-- Component completed because the call was disconnected -->
<presence to='16577@app.Rayo.net/1'
    from='9f00061@call.Rayo.net/fgh4590'>
    <complete xmlns='urn:xmpp:Rayo:ext:1'>
        <error xmlns='urn:xmpp:Rayo:ext:complete:1'>
            Something really bad happened
        </error>
    </complete>
</presence>
```

Ask Component

```
<iq type='set' to='9f00061@call.Rayo.net/1'
    from='16577@app.Rayo.net/1'>
    <ask xmlns='urn:xmpp:Rayo:ask:1'
        bargein='true'
        min-confidence='0.3'
        mode='speech|dtmf|any'
        recognizer='en-US'
        terminator='#'
        timeout='12000'>
        <prompt voice='allison'>
            Please enter your four digit pin
        </prompt>
        <choices content-type='application/grammar+voxeo'>
            [4 DIGITS]
        </choices>
    </ask>
</iq>
<choices /> is required
```

Events

```
<!-- Successfull Input -->
<presence to='16577@app.Rayo.net/1'
    from='9f00061@call.Rayo.net/fgh4590'>
    <complete xmlns='urn:xmpp:Rayo:ext:1'>
        <success mode="speech" confidence="0.45"
            xmlns='urn:xmpp:Rayo:ask:complete:1'>
            <interpretation>1234</interpretation>
            <utterance>one two three four</utterance>
        </success>
    </complete>
</presence>
<!-- Incorrect Input -->
<presence to='16577@app.Rayo.net/1'
    from='9f00061@call.Rayo.net/fgh4590'>
    <complete xmlns='urn:xmpp:Rayo:ext:1'>
        <nomatch xmlns='urn:xmpp:Rayo:ask:complete:1'/>
    </complete>
</presence>
<!-- No Input Provided -->
<presence to='16577@app.Rayo.net/1'
    from='9f00061@call.Rayo.net/fgh4590'>
    <complete xmlns.'urn:xmpp:Rayo:ext:1'>
        <noinput xmlns='urn:xmpp:Rayo:ask:complete:1'/>
    </complete>
</presence>
<!-- Component was stopped -->
<presence to='16577@app.Rayo.net/1'
    from='9f00061@call.Rayo.net/fgh4590'>
    <complete xmlns='urn:xmpp:Rayo:ext:1'>
        <stop xmlns='urn:xmpp:Rayo:ext:complete:1'/>
    </complete>
</presence>
<!-- Component completed because the call was disconnected -->
<presence to='16577@app.Rayo.net/1'
    from='9f00061@call.Rayo.net/fgh4590'>
    <complete xmlns='urn:xmpp:Rayo:ext:1'>
        <hangup xmlns='urn:xmpp:Rayo:ext:complete:1'/>
    </complete>
</presence>
<!-- Component completed because the call was disconnected -->
<presence to='16577@app.Rayo.net/1'
    from='9f00061@call.Rayo.net/fgh4590'>
    <complete xmlns='urn:xmpp:Rayo:ext:1'>
        <error xmlns='urn:xmpp:Rayo:ext:complete:1'>
            Something really bad happened
        </error>
    </complete>
</presence>
```

Transfer Component

```
<iq type='set' to='9f00061@call.Rayo.net/1'
    from='16577@app.Rayo.net/1'>
    <transfer xmlns='urn:xmpp:Rayo:transfer:1'
        from='tel:+14152226789'
        terminator='*'
        timeout='120000'
        answer-on-media='true'>
        <to>tel:+4159996565</to>
        <to>tel:+3059871234</to>
        <ring voice= 'allison'>
            <audio url='http://acme.com/transfering.mp3'>
                Please wait while your call is being transferred.
            </audio>
        </ring>
    </transfer>
</iq>
```

Events

```
<!-- Transfer completed and B leg disconnected. The A leg is joined back to
    the media server and is free to run additional components -->
<presence to='16577@app.Rayo.net/1'
from='9f00061@call.Rayo.net/fgh4590'>
    <complete xmlns='urn:xmpp:Rayo:ext:1'>
        <success xmlns='urn:xmpp:Rayo:transfer:complete:1' />
    </complete>
</presence>
<!-- Timeout Expired -->
<presence to='16577@app.Rayo.net/1'
from='9f00061@call.Rayo.net/fgh4590'>
    <complete xmlns='urn:xmpp:Rayo:ext:1'>
        <timeout xmlns='urn:xmpp:Rayo:transfer:complete:1' />
    </complete>
</presence>
<!-- Caller pressed terminator -->
<presence to='16577@abb.Rayo.net/1'
from='9f00061@call.Rayo.net/fgh4590'>
    <complete xmlns='urn:xmpp:Rayo:ext:1'>
        <terminator xmlns='urn:xmpp:Rayo:transfer:complete:1' />
    </complete>
</presence>
<!-- Destination was busy -->
<presence to='16577@abb.Rayo.net/1'
from='9f00061@call.Rayo.net/fgh4590'>
    <complete xmlns='urn:xmpp:Rayo:ext:1'>
        <busy xmlns='urn:xmpp:Rayo:transfer:complete:1' />
    </complete>
</presence>
<!-- Destination rejected the call -->
<presence to='16577@apb.Rayo.net/1'
from='9f00061@call.Rayo.net/fgh4590'>
    <complete xmlns='urn:xmpp:Rayo:ext:1'>
        <reject xmlns='urn:xmpp:Rayo:transfer:complete:1' />
    </complete>
</presence>
<!-- Component was stopped -->
<presence to='16577@app.Rayo.net/1'
from='9f00061@call.Rayo.net/fgh4590'>
    <complete xmlns='urn:xmpp:Rayo:ext:1'>
        <stop xmlns='urn:xmpp:Rayo:ext:complete:1' />
    </complete>
</presence>
<!-- Component completed because the call was disconnected -->
<presence to='16577@app.Rayo.net/1'
from='9f00061@call.Rayo.net/fgh4590'>
    <complete xmlns='urn:xmpp:Rayo:ext:1'>
        <hangup xmlns='urn:xmpp:Rayo:ext:complete:1' />
    </complete>
</presence>
<!-- Component completed because the call was disconnected -->
<presence to='16577@app.Rayo.net/1'
from='9f00061@call.Rayo.net/fgh4590'>
    <complete xmlns='urn:xmpp:Rayo:ext:1'>
        <error xmlns='urn:xmpp:Rayo:ext:complete:1'>
            Something really bad happened
        </error>
    </complete>
</presence>
```

Conference Component

```
<iq type='set' to='9f00061@call.Rayo.net/1'
from='16577@app.Rayo.net/1'>
    <conference xmlns='urn:xmpp:Rayo:conference:1'
        name='1234'
        mute='false'
        terminator='*'
        tone-passthrough='true'
        moderator='true'>
        <announcement voice="allison">
            Jose de Castro has entered the conference
        </announcement>
        <music voice="herbert">
            The moderator how not yet joined.. Listen to this awesome music while you wait.
            <audio url='http://www.yanni.com/music/awesome.mp3' />
        </music>
    </conference>
</iq>
```

Commands

```
<!-- Mute this participant -->
<iq type='set' to='9f00061@Rayo.net/d951cc41'
    from='16577@app.Rayo.net/1'>
    <mute xmlns='urn:xmpp:Rayo:conference:1' />
</iq>
<!-- Unmute this participant -->
<iq type='set' to='9f00061@Rayo.net/d951cc41'
    from='16577@app.Rayo.net/1'>
    <unmute xmlns='urn:xmpp:Rayo:conference:1' />
</iq>
<!-- Kick this participant, Do we need this? -->
<iq type='set' to='9f00061@Rayo.net/d951cc41'
    from='16577@app.Rayo.net/1'>
    <kick xmlns='urn:xmpp:Rayo:conference:1'>asshole</kick>
</iq>
```

Events

```
<!-- Indicates that this participant has been put on hold -->
<presence to='16577@app.Rayo.net/1'
from='9f00061@Rayo.net/d951cc41'>
    <on-hold xmlns='urn:xmpp:Rayo:conference:1'/>
</presence>
<!-- Indicates that this participant has been put back into the conference -->
<presence to='16577@app.Rayo.net/1'
from='9f00061@Rayo.net/d951cc41'>
    <off-hold xmlns='urn:xmpp:Rayo:conference:1'/>
</presence>
<!-- Participant was kicked from the conference -->
<presence to='16577@app.Rayo.net/1'
from='9f00061@Rayo.net/d951cc41'>
    <complete xmlns='urn:xmpp:Rayo:ext:1'>
        <kick xmlns='urn:xmpp:Rayo:conference:complete:1'>wouldn't stop talking</kick>
    </complete>
</presence>
<!-- Participant pressed the terminator -->
<presence to='16577@app.Rayo.net/1'
from='9f00061@Rayo.net/d951cc41'>
    <complete xmlns='urn:xmpp:Rayo:ext:1'>
        <terminator xmlns='urn:xmpp:Rayo:conference:complete:1' />
    </complete>
```

```
</presence>
<!-- Component was stopped -->
<presence to='16577@app.Rayo.net/1'
from='9f00061@call.Rayo.net/fgh4590'>
    <complete xmlns='urn:xmpp:Rayo:ext:1'>
      <stop xmlns='urn:xmpp:Rayo:ext:complete:1' />
    </complete>
</presence>
<!-- Component completed because the call was disconnected -->
<presence to='16577@app.Rayo.net/1'
from='9f00061@call.Rayo.net/fgh4590'>
    <complete xmlns='urn:xmpp:Rayo:ext:1'>
      <hangup xmlns='urn:xmpp:Rayo:ext:complete:1' />
    </complete>
</presence>
<!-- Component completed because the call was disconnected -->
<presence to='16577@apo.Rayo.net/1'
from='9f00061@call.Rayo.net/fgh4590'>
    <complete xmlns='urn:xmpp:Rayo:ext:1'>
      <error xmlns='urn:xmpp:Rayo:ext:complete:1'>
        Something really bad happened
      </error>
    </complete>
</presence>
```

While the embodiments of this invention that have been described are the preferred implementations, those skilled in the art will understand that variations thereof may also be possible.

It is claimed:

1. A method of operating a server, comprising:
   deploying a plurality of application servers on a telephony network for providing telephony and communication services;
   providing a communication framework at the plurality of application servers for the telephony and communication services, the communication framework providing an API with a set of class objects for unified call control and media control, so that the API allows programmatic access to the telephony and communication services by a plurality of remote API clients via the telephony network;
   providing, at the plurality of application servers, a messaging API server, the messaging API server having a predefined text-based messaging protocol for the API wherein the text-based messaging protocol for the API abstracts a corresponding plurality of at least telephony and media functions;
   providing a message broker stored and operating on a network-connected server resident in and compatible with the network and adapted to mediate text-based messaging between the plurality of remote API clients and the plurality of application servers;
   federating the plurality of application servers across a plurality of messaging domains based at least on properties and status of the plurality of application servers;
   receiving, into the plurality of application servers, commands issued by the plurality of API clients for invoking and manipulating the class objects relative to an ongoing call or media session, the commands being packaged as messages conforming to the predefined text-based messaging protocol for the API;
   validating the messages for conformity to the API text-based messaging protocol;
   parsing the messages according to the predefined text-based messaging protocol for the API to obtain the commands;
   determining whether the commands correspond to a set of commands supported by the a predefined text-based messaging protocol for the API;
   locating one or more application servers best suited for executing the commands based at least on the properties and the status; and
   executing, at the one or more application servers, the commands to the call or media session in the order the commands become available thereby providing direct real-time call and media control to the API client via the messaging API;
   wherein the commands issued by the remote API client are a rendering of an application script to realize an interactive voice response application or a self-help application.

2. The method as in claim 1, wherein:
   the messaging is exchanged using a protocol for presence and real-time communication.

3. The method as in claim 1, wherein the set of class objects for unified call control and media control are built from class object primitives of a standards-based call control API and a standards-based media control API.

4. The method as in claim 3, wherein the set of class objects are based on a specific object model that dictates certain predefined constructs of the class objects primitives of the call control API and the media control API.

5. A system for providing telephony and communication services on a telephony network, comprising:
   a plurality of application servers for providing telephony and communication services on a telephony network;
   a communication framework providing an API with a set of class objects for unified call control and media control, so that the API allows programmatic access to the telephony and communication services by a plurality of remote API clients via the telephony network;
   a messaging API server having a predefined text-based messaging protocol for the API, the messaging API server receiving into the application server commands issued by the plurality of remote API clients for invoking and manipulating the class objects relative to an ongoing call or media session, the commands being packaged as messages conforming to the predefined text-based messaging protocol for the API wherein the text-based messaging protocol for the API abstracts a corresponding plurality of at least telephony and media functions;
   a message broker stored and operating on a network-connected server and adapted to mediate text-based messaging between the plurality of remote API clients and the plurality of application servers wherein the plurality of application servers are federated across a plurality of messaging domains based at least on properties and status of the plurality of application servers further wherein one or more application servers best suited for executing the commands are located based at least on the properties and the status;
   a command parser for parsing the messages according to the predefined text-based messaging protocol for the API to obtain the commands;
   a validator for validating the messages for conformity to the text-based messaging protocol wherein the validator determines whether the commands correspond to a set of commands supported by the a predefined text-based messaging protocol for the API; and
   a virtual machine for executing the commands to the call in the order the commands become available thereby providing direct real-time call and media control to the plurality of remote API clients via the messaging API;

wherein the commands issued by the remote API client are a rendering of an application script to realize an interactive voice response application or a self-help application.

6. The application server as in claim 5, wherein:
the messaging is exchanged using a protocol for presence and real-time communication.

7. The application server as in claim 5, wherein the set of class objects for unified call control and media control are built from class object primitives of a standards-based call control API and a standards-based media control API.

8. The application server as in claim 7, wherein the set of class objects are based on a specific object model that dictates certain predefined constructs of the class objects primitives of the call control API and the media control API.

\* \* \* \* \*